US012664490B2

(12) United States Patent
Darwin, II et al.

(10) Patent No.: US 12,664,490 B2
(45) Date of Patent: Jun. 23, 2026

(54) SYSTEM AND METHOD FOR INTERMODAL FACILITY MANAGEMENT

(71) Applicant: BNSF Railway Company, Fort Worth, TX (US)

(72) Inventors: Robert Cleveland Darwin, II, Arlington, TX (US); Gregory Edward Kolesar, Fort Worth, TX (US); Joseph C. Lumbert, Fort Worth, TX (US); Mitchel Varela, Fort Worth, TX (US)

(73) Assignee: BNSF Railway Company, Fort Worth, TX (US)

(*) Notice: Subject to any disclaimer, the term of this patent is extended or adjusted under 35 U.S.C. 154(b) by 921 days.

(21) Appl. No.: 17/725,366

(22) Filed: Apr. 20, 2022

(65) Prior Publication Data

US 2022/0405657 A1      Dec. 22, 2022

Related U.S. Application Data

(62) Division of application No. 17/304,222, filed on Jun. 16, 2021, now Pat. No. 11,544,643.

(51) Int. Cl.
*G06Q 10/00* (2026.01)
*G06Q 10/0631* (2023.01)
(Continued)

(52) U.S. Cl.
CPC ..... *G06Q 10/0631* (2013.01); *G06Q 10/0833* (2013.01); *G06Q 10/08355* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 9,961,507 | B1 | 5/2018 | Mendelson |
| 10,009,745 | B2 | 6/2018 | Somani et al. |

(Continued)

FOREIGN PATENT DOCUMENTS

| | | |
|---|---|---|
| WO | 2009140669 A2 | 11/2009 |
| WO | 2018227241 A1 | 12/2018 |
| WO | 2019106557 A1 | 6/2019 |

OTHER PUBLICATIONS

How smart load boards and digital freight matching tools are revolutionizing the logistics space, Mar. 19, 2021, Codal, https://codal.com/insights/how-smart-load-boards-and-digital-freight-matching-tools-are-revolutionizing-the-logistics-space/, p. 1-8. (Year: 2021).*

(Continued)

*Primary Examiner* — Joseph M Waesco
(74) *Attorney, Agent, or Firm* — Whitaker Chalk Swindle & Schwartz PLLC; Enrique Sanchez, Jr.

(57) ABSTRACT

An intermodal facility management system for facilitating delivery, pickup, facility access, and cargo management is presented. The system can receive data from clients within proximity of one or more wireless beacons. The system can capture data from clients that ingress or egress into or out of a facility, respectively, and validate received data with the captured data. The system can enable cargo transfer optimization by forecasting client arrival times to particular destination locations, and the forecasting can account for access point delays, such as can be due to an authentication process. The system can provide a measure of redundancy in ensuring that particular cargo is being sent to proper locations, and the system can further prompt facility personnel to ensure that cargo is accessible and ready for dispatch upon arrival of any given client.

12 Claims, 11 Drawing Sheets

(51) Int. Cl.
  *G06Q 10/083* (2023.01)
  *G06Q 10/0833* (2023.01)
  *H04W 4/021* (2018.01)

(56) References Cited

U.S. PATENT DOCUMENTS

| | | | | |
|---|---|---|---|---|
| 10,783,506 | B2 | 9/2020 | Dutta et al. | |
| 2002/0161674 | A1* | 10/2002 | Scheer | G06Q 10/0631 705/28 |
| 2004/0243664 | A1 | 12/2004 | Horstemeyer | |
| 2008/0077474 | A1 | 3/2008 | Dumas et al. | |
| 2009/0125350 | A1* | 5/2009 | Lessing | G06Q 10/08 705/7.12 |
| 2011/0299422 | A1 | 12/2011 | Kim et al. | |
| 2014/0309935 | A1* | 10/2014 | Ricci | G07C 9/00563 701/540 |
| 2014/0310075 | A1* | 10/2014 | Ricci | G01C 21/26 705/13 |
| 2015/0134984 | A1 | 5/2015 | Sheykh-Zade et al. | |
| 2016/0224930 | A1* | 8/2016 | Kadaba | G06Q 10/0631 |
| 2016/0247377 | A1* | 8/2016 | Ricci | H04W 12/088 |
| 2017/0148313 | A1 | 5/2017 | Zografos | |
| 2017/0316696 | A1 | 11/2017 | Bartel | |
| 2018/0039917 | A1* | 2/2018 | Buttolo | G06Q 10/109 |
| 2018/0061145 | A1 | 3/2018 | Blustein | |
| 2018/0322362 | A1 | 11/2018 | Souder et al. | |
| 2019/0066033 | A1* | 2/2019 | Mains, Jr. | G06Q 10/06311 |
| 2019/0072979 | A1 | 3/2019 | Sukhomlinov et al. | |
| 2019/0279440 | A1* | 9/2019 | Ricci | G06Q 10/20 |
| 2020/0005205 | A1 | 1/2020 | Tsur et al. | |
| 2020/0126065 | A1 | 4/2020 | Rodriguez et al. | |
| 2020/0211306 | A1 | 7/2020 | Thomas | |
| 2020/0277847 | A1 | 9/2020 | Rojas et al. | |
| 2020/0349496 | A1* | 11/2020 | Irwin | G06Q 10/083 |
| 2020/0413458 | A1 | 12/2020 | Kennedy et al. | |
| 2021/0182996 | A1 | 6/2021 | Cella et al. | |
| 2021/0362564 | A1 | 11/2021 | Polyzois et al. | |
| 2024/0370627 | A1* | 11/2024 | Ricci | G05D 1/0276 |

OTHER PUBLICATIONS

Saraf, Adita et al.; Problabilistic and Coordinated Traffic Flow Management Optimization, 2013, 16 pages, AIAA Aviation Forum.
PCT International Patent Application No. PCT/US/2022/032819, filed Jun. 9, 2022, International Search Report and Written Opinion, dated Aug. 25, 2022, 14 pages.
Beacontrax, IoT based Vehicle Access Control, Oct. 14, 2020.
CITIFYD, Hands-Free Access, Oct. 14, 2020.
QINKK , Park easily and conveniently in car parks without the need for tickets, Oct. 14, 2020.
LocoMobi , LocoMobi Introduces Patent-Pending Bluetooth Access Control Technology to Connect the Parking and Transportation Ecosystem, Aug. 14, 2014.
Nordic, Using BLE to automate gate opener, Oct. 14, 2020.

* cited by examiner

500

SYSTEM AND METHOD FOR INTERMODAL FACILITY MANAGEMENT

CROSS-REFERENCE TO RELATED APPLICATIONS

The present application is a Divisional Application of U.S. patent application Ser. No. 17/304,222, filed on Jun. 16, 2021, entitled "SYSTEM AND METHOD FOR INTER-MODAL FACILITY MANAGEMENT," the contents of which are incorporated herein in their entireties for all purposes.

TECHNICAL FIELD

The present disclosure relates generally to management of intermodal facilities, such as those commonly used by railway systems.

BACKGROUND

Railroad systems can have operations facilities disposed next to or around railroad tracks. These intermodal facilities, often having the appearance of shipping yards, can contain a multitude of shipping containers and several cranes that facilitate the hoisting, relocation, and depositing of the containers. When a train enters the facility bearing its freight (e.g., shipping containers), the cranes lift the containers off of the train and stack them in an organized fashion in the facility. Generally, these containers need to be distributed further, which is usually accomplished via fleets of semi-trucks or boats (fleet vehicles). The containers remain ground-stacked while awaiting arrival of the trucks that are destined to bear them.

The intermodal facilities are designed to facilitate the constant entering and exiting of dozens of vehicles in and out of their borders. As such, the facilities can have one or more access points through which a vehicle can enter the facility. The access points can generally be gated and require some sort of authentication upon arrival to ensure that appropriate personnel are entering the facility. Kiosks are often located in each lane of a given access point that a driver can interact with to gain permission to enter. Further, within the intermodal facilities, there are driving lines (for through traffic) and truck spots—truck spots are the desig-nated areas into which semis park to receive the freight or cargo they are meant to carry. As an example, a semi-truck bearing a container travels to the facility to deposit the loaded container, and to additionally receive a different container to continue the shipping process. Traditionally, upon approach to the facility, the driver stops at the gate and interacts with a kiosk, offering a PIN code, a ID number, scanning a QR code, or otherwise providing proof of iden-tify and/or verification to the kiosk and/or facility personnel to gain entry. Further, the kiosk can deliver instructions related to the cargo to be picked up—the kiosk will give the driver, for example, the container number for its cargo and the truck spot in which to park to receive the cargo. Once inside, the driver can deposit the currently-loaded cargo at the designated drop off area and travel to the truck spot designated for it at the kiosk to receive the deposit of its next freight. The crane operator, located up to 8-10 stories above the ground, is also made aware of the truck spot in which a truck should be parked to deposit a specifically labeled container. The crane operator can look down, see the truck in the designated truck spot, hoist the appropriate container, and subsequently deposit the container on the chassis.

However, due to the sheer amount of vehicle traffic within a facility, the number of containers, the number of potential pickup/drop-off locations, etc., it is nigh impossible to, e.g., properly time the arrival of a vehicle to a pickup location with the readiness of a crane to deposit a given cargo. Significant time is wasted as vehicle and crane operators must wait on one another to facilitate an exchange. Further, these delays can be exacerbated by delays at intermodal facility access points, where vehicles can become stuck at an inoperable gate or otherwise fail to be properly authenti-cated, increasing congestion and decreasing productivity.

SUMMARY

The present disclosure achieves technical advantages as a system and method for intermodal facility management that can facilitate optimal pickup, delivery, and accessibility of cargo. The system can forecast arrival times of individual clients, such as by detecting clients on approach and accounting for delays caused by authentication processes and access point congestion. The system can further identify locations of individual cargos within a facility and determine if a cargo is accessible, such as by a crane, to be dispatched from the facility to another vehicle, such as a truck or a boat. The system can be configured to prompt facility personnel and/or components to relocate cargo if it is not accessible upon recognition that a client to which the cargo is allocated is approaching the facility. The system can also receive data related to a proper transport and delivery parameters for a given cargo, and validate and/or authenticate such informa-tion, such as upon arrival of a client to a facility. To mitigate intra-facility congestion and optimize traffic flow, the system can further determine one or more paths from a given access point to a specific delivery or pickup location—the system can transmit these intra-facility paths to one or more clients. If a client strays from an optimal path, the system can generate prompts to the client to redirect, and/or generate notifications to other clients of potential delay.

The present disclosure solves the technological problem of providing an intermodal facility management system configured to account for ever-changing arrival times of fleet vehicles needing to access a facility, and further optimize intra-facility operations. The present disclosure can improve existing systems by calculating accurate and reliable expected arrival times from vehicle motion data, access point data, average access point delay times, and other metrics. The present disclosure can further generate prompts based on this data to ensure that facility components and personnel can align with vehicle operators to maximize efficiency in cargo delivery and pickup. Advantageously, such specialized processing can also provide the benefit of validating cargo being carried into or out of a facility, as the system can leverage access and/or exit points to data capture and validate data, such as to ensure that the correct cargo is in transit to the correct location. The system can utilize servers and clients to authenticate users and leverage client location data to achieve this technological advancement.

The present disclosure improves the performance and functionality of the system itself by implementing special-ized algorithms that can utilize proximity thresholds to facilitate authentication, timing calculations, prompt genera-tion, and real-time updates transmitted to clients within a network. In contrast, traditional systems simply rely on often-incomplete data and assume uniform conditions with-out adjusting values based upon feedback values to account for, e.g., variable arrival times, access point delays, inac-cessible cargo, and other factors. In certain embodiments, the disclosed intermodal facility management system not only determines when data needs to be collected and processed, but can also determine if the such factors should change, e.g., and expected time of arrival of a client to the delivery location. In some embodiments, the system can utilize a plurality of wireless beacons placed strategically around and throughout an intermodal facility. In some embodiments, the wireless beacons can facilitate communication between a client and the system, triangulate locations of clients or other components, and/or define proximity thresholds that the system can integrate into its process flow.

The disclosed intermodal facility management system can include a server in operable communication with a database and clients. The system can further be in operable connection with a plurality of wireless beacons, sensors, cameras, or any other components designed to capture data related to position and/or identification. The system can generate records containing relevant data, including client identity, vehicle identity, cargo identify, driver identify, vendor identify, time and date of detection, the direction the vehicle is traveling when detected, how fast a vehicle is traveling, the proximity of the vehicle to a given location (such as to an access point), and a path that a vehicle takes within a facility to arrive at a dispatch location.

It is an object of the disclosure to provide a system for intermodal facility management. It is a further object of the disclosure to provide a method for cargo management and cargo delivery management. These and other objects are provided by at least the following embodiments.

In one embodiment, the present disclosure can include a system for managing an intermodal facility, comprising: a memory having a first database with a plurality of data, thresholds, and specifications related to at least one intermodal facility, at least one access point of the at least one intermodal facility, at least one client, and at least one cargo; and a computer processor operably coupled to the memory and capable of executing machine-readable instructions to perform program steps, the program steps including: detecting a client; receiving positional data of the client; receiving identification information; determining a location of the client; calculating an average access point delay; determining an expected time of arrival using the average access point delay and the location of the client; transmitting the expected time of arrival; if the client satisfies a proximity threshold, authenticating the client or the identification information; and if the client or the identification information are authenticated, granting entry permission. In another embodiment, the program steps can further include: receiving motion data of the client; calculating, via the processor, an expected time until approach using the positional data and the motion data; and using the expected time until approach, the average access point delay, and the location of the client in determining the expected time of arrival. In another embodiment, the program steps can further include: if one or more additional clients are within a geofence: determining a number of additional clients; and calculating an expected delay time using the average access point delay and the number of additional clients. In another embodiment, the program steps can further include: determining a number of operable access points; and using the average access point delay, the number of additional clients, and the number of operable access points in calculating the expected delay time. In another embodiment, the program steps can further include: determining a time value indicating a duration that the client satisfied the proximity threshold; and adjusting the average access point delay with the time value. In another embodiment, the program steps can further include: transmitting a destination location; determining at least one path to the destination location; receiving positional data points of the client as the client moves; and comparing the positional data points to the at least one path. In another embodiment, the program steps can further include: if the positional data points do not conform to the at least one path: generating, via the processor, a directional prompt. In another embodiment, the program steps can further include updating the expected time of arrival. In another embodiment, the system can further include at least one wireless communication beacon. In another embodiment, the at least one wireless communication beacon can be used in establishing the proximity threshold.

In one embodiment, the present disclosure can include a system for managing cargo in a facility, comprising: a memory having a first database with a plurality of data, thresholds, and specifications related to at least one intermodal facility, at least one client, and at least one cargo; and a networked computer processor operably coupled to the memory and capable of executing machine-readable instructions to perform program steps, the program steps including: detecting a client; receiving positional data; receiving identification information; determining an expected time of arrival of the client; transmitting the expected time of arrival; determining a cargo allocated to the client; identifying a cargo location; if the cargo is not accessible, determining an alternate zone and generating, via the processor, a prompt to relocate the cargo to the alternate zone; and if the cargo is relocated, updating the cargo location and transmitting the cargo location. In another embodiment, the program steps can further include: if the client satisfies a proximity threshold, authenticating the client, the identification information, or both; and if the client, the identification information, or both are authenticated, granting entry permission. In another embodiment, the program steps can further include: determining at least one path to the cargo location; receiving positional data points of the client as the client moves; and comparing the positional data points to the at least one path. In another embodiment, the program steps can further include: if the positional data points do not conform to the at least one path: generating a directional prompt.

In one embodiment, the present disclosure can include a method of managing cargo delivery, the method comprising the steps of: detecting a client; receiving positional data; receiving identification information; determining a cargo to be delivered; identifying a delivery location; if the delivery location is not accessible, determining an alternate delivery zone and updating the delivery location; determining an expected time of arrival of the client; transmitting the expected time of arrival; if the client satisfies a proximity threshold, capturing additional identification information and comparing the identification information with the additional identification information to validate the identification information; and transmitting the delivery location. In another embodiment, the method can further include the step of: if the identification information is validated, granting entry permission. In another embodiment, the method can further include the step of: if the identification information is not validated, generating, via the processor, an alert. In another embodiment, the method can further include the steps of: determining at least one path to the delivery location; receiving positional data points of the client as the client moves; and comparing the positional data points to the at least one path. In another embodiment, the method can further include the steps of: if the positional data points do not conform to the at least one path: generating a directional prompt. In another embodiment, at least one wireless communication beacon can be used in generating the positional data points.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1:
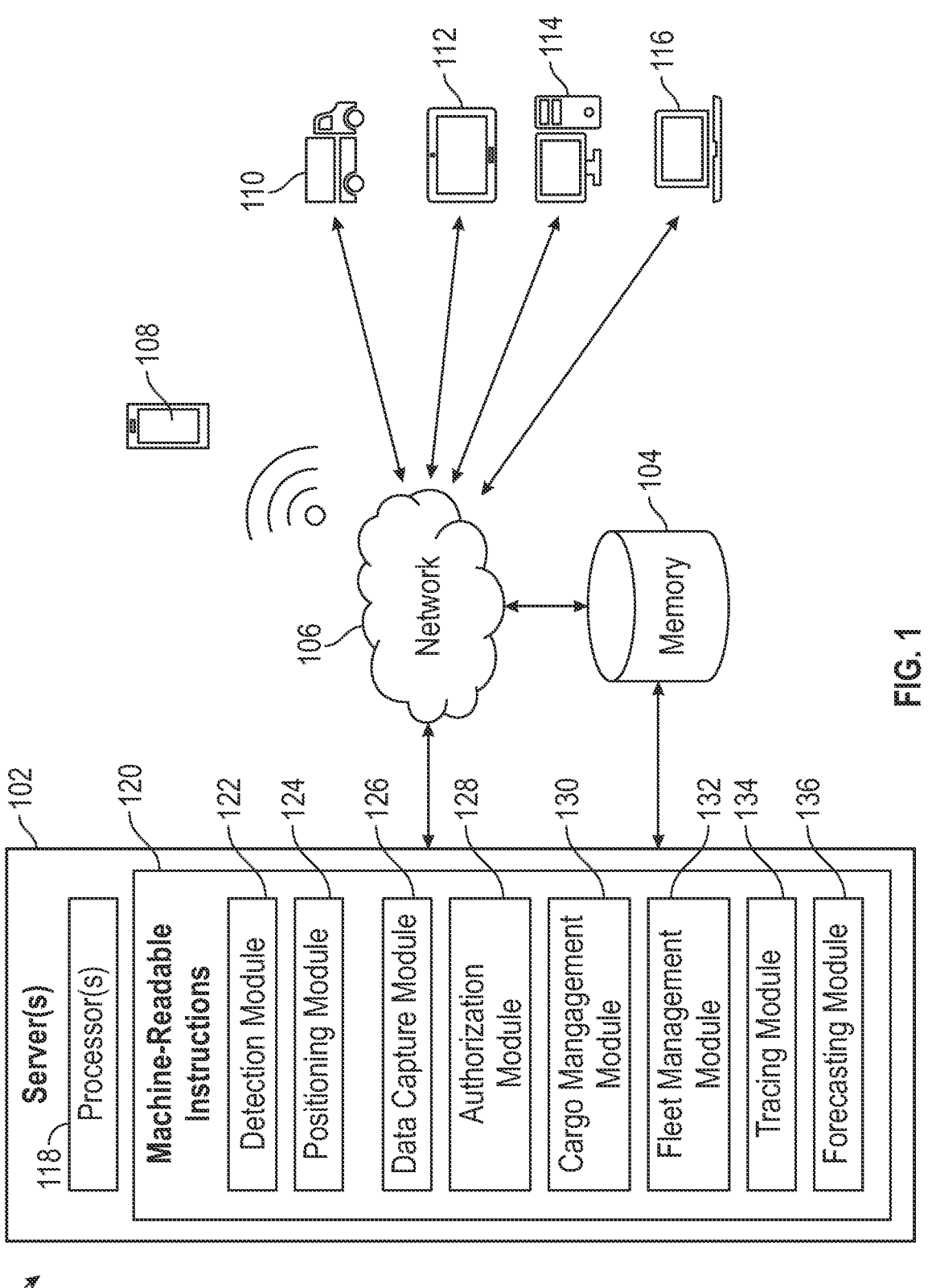
FIG. 1 illustrates an exemplary facilities management system schematic, in accordance with one or more exemplary embodiments of the present disclosure.

FIG. 1 illustrates a schematic view of a facilities management system 100 in accordance with one or more embodiments of the present disclosure. The system 100 can include one or more servers 102 operably coupled to a database (memory) 104. The server 102 can be operably coupled to one or more clients 108, 110, 112, 114, 116 via a network connection 106. The clients can be a physical device (e.g., mobile phone 108, on-board computer 110 or vehicle 110, tablet 112, computer 114, 116, wearable device, or other suitable device), program, or an application. In one embodiment, the system 100 can be integrated with a railroad system or railroad infrastructure to facilitate the management of vehicles, personnel, cargo, and/or other components related thereto. It will be understood by those having skill in the art that detections, captured data, locations, forecasts, measurements, determinations, alerts, notifications, etc. encompassed by the system 100 can be promulgated and/or accessible to, in one embodiment, a railroad system at large via the network 106 or other operable connection. In one embodiment, the server 102 can include machine-readable instructions 120; in another embodiment, the server 102 can access machine readable instructions 120. In another embodiment, the machine-readable instructions can include instructions related to a detection module 122, a positioning module 124, a data capture module 126, an authorization module 128, a cargo management module 130, a fleet management module 132, a tracing module 134, and/or a forecasting module 136.

The aforementioned system components (e.g., server(s) 102, memory 104, client(s) 110, 112, 114, 116, etc.) can be communicably coupled to each other via the network 106, such that data can be transmitted. The network 106 can be the Internet, intranet, or other suitable network. The data transmission can be encrypted, unencrypted, over a VPN tunnel, or other suitable communication means. The network 106 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 106.

The data transmitted to and from the components of system 100 (e.g., the server 102, clients, etc.), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

One or more server(s) 102 can be implemented in hardware, software, or a suitable combination of hardware and software therefor, and may comprise one or more software systems operating on one or more servers, having one or more processors 118, with access to memory 104. Server(s) 102 can include electronic storage, one or more processors, and/or other components. Server(s) 102 can include communication lines, connections, and/or ports to enable the exchange of information via a network 106 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 104 internally.

Memory 104 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 120, software algorithms, control logic, data generated by processor(s), data received from server(s), data received from computing platform(s), and/or other data that can enable server(s) to function as described herein. The electronic storage can also include third-party databases accessible via the network 106.

Processor(s) 118 can be configured to provide data processing capabilities in server(s) 102. As such, processor(s) 118 can include one or more of a digital processor, an analog processor, a digital circuit designed to process information, an analog circuit designed to process information, a state machine, and/or other mechanisms for electronically processing information, such as FPGAs or ASICs. The processor(s) 118 can be a single entity or include a plurality of processing units. These processing units can be physically located within the same device, or processor(s) 118 can represent processing functionality of a plurality of devices or software functionality operating alone, or in concert.

The processor(s) 118 can be configured to execute machine-readable instructions 106 or machine learning modules via software, hardware, firmware, some combination of software, hardware, and/or firmware, and/or other mechanisms for configuring processing capabilities on processor(s) 118. As used herein, the term "machine-readable instructions" can refer to any component or set of components that perform the functionality attributed to the machine-readable instructions component 120. This can include one or more physical processors 118 during execution of processor-readable instructions, the processor-readable instructions, circuitry, hardware, storage media, or any other components.

The server(s) 102 can be configured with machine-readable instructions 120 having one or more functional modules. The machine-readable instructions 120 can be implemented on one or more servers 102, having one or more processors 118, with access to memory 104. The machine-readable instructions 120 can be a single networked node, or a machine cluster, which can include a distributed architecture of a plurality of networked nodes. The machine-readable instructions 120 can include control logic for implementing various functionality, as described in more detail below. The machine-readable instructions 120 can include certain functionality associated with the system 100. Additionally, the machine-readable instructions 120 can include a smart contract or multi-signature contract that can process, read, and write data to a database, distributed ledger, or blockchain.

Figure 2:
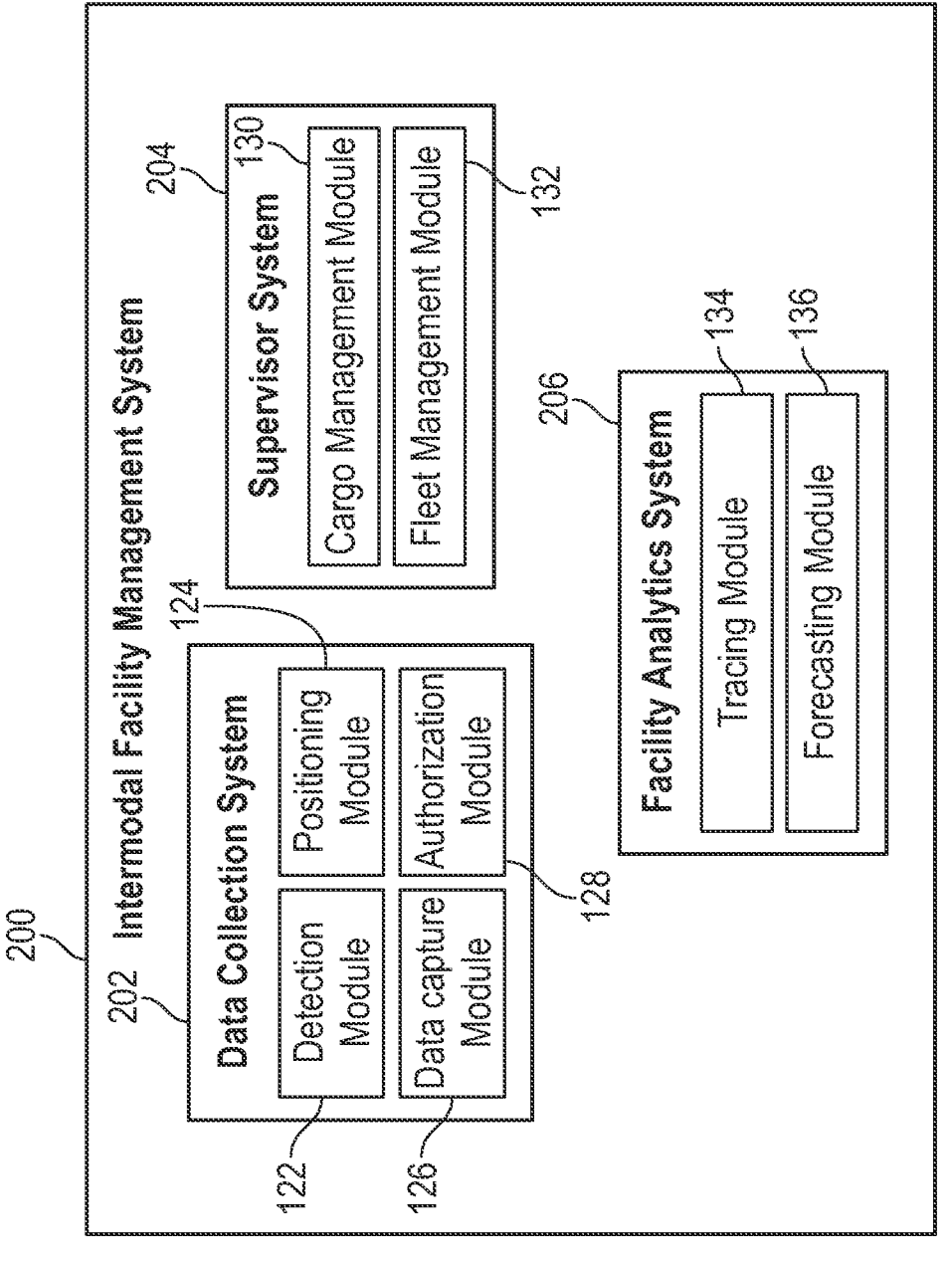
FIG. 2 illustrates an exemplary block diagram of an intermodal facility management system, in accordance with one or more exemplary embodiments of the present disclosure.

FIG. 2 illustrates a schematic view of an intermodal facility management system 200, in accordance with one or more exemplary embodiments of the present disclosure. Management system 200 can include a data collection system 202, a supervisor system 204, and a facility analytics system 206. In one exemplary embodiment, the data collection system 202 can include a detection module 122, a positioning module 124, a data capture module 126, and an authorization module 128. The detection module 122, positioning module 124, data capture module 126, and authorization module 128 can implement one or more algorithms to facilitate data collection related to intermodal facility management, including recognition, location-retrieving, detection, and wireless communication beacon (wireless beacon) (beacon) recognition algorithms. In one embodiment, the data collection system 202 can be configured to initiate upon detection of a client and subsequently capture a myriad of data related to the client and facility it is destined for.

In one embodiment, the detection module 122 can detect a client (e.g., a vehicle, an on-board computer, a mobile phone, etc.), such as a client that is in motion. For example, the data collection system 202 can be in operable communication with cameras, wireless beacons, mobile phones, LIDAR, radar, or any other device or mechanism suitable to detect movement and/or position. In one embodiment, the detection module 122 can be configured to detect proximity, such as proximity of a client to, e.g., a wireless beacon. In one embodiment, the data collection system 202 can be configured to receive data from a client when the client comes within a proximity threshold of a wireless beacon (e.g., a Bluetooth Low Energy (BLE) beacon). For example, the data collection system 202 can be configured to receive data from a client when a wireless beacon is recognized. In another embodiment, the detection module 122 can be configured to receive data from these components and determine if a client is present in a particular area.

In another embodiment, the positioning module 124 can be configured to receive and/or obtain and/or determine positional data (e.g., data related to a physical location of a client). For example, the data collection system 202 can be in operable connection with one or more clients that can collect, store, and/or make available data related to position. In one embodiment, the positioning module 124 can be configured to receive positional data from a client; in another embodiment, the positioning module 124 can be configured to receive data from a client related to a particular wireless beacon. In another embodiment, the data collection system 202 can have access to a plurality of data related to wireless beacons, and can further receive from a client a transmission identifying a wireless beacon that it has come into proximity of. In another embodiment, the positioning module 124 can utilize GPS to determine a location of a client. In one example, detection by the detection module 122 can initiate the positioning module 124, such that the positioning module 124 can receive and/or determining positional data corresponding to a window of time in which the client is detected. In another embodiment, the data collection system 202 can periodically receive (wired or wirelessly) positional data from one or more clients and/or other components in a network it is in communication with. In another embodiment, the positioning module 124 can asynchronously cause to be transmitted (wired or wirelessly) positional data to one or more clients or other system 200 components based upon one or more thresholds (e.g., proximity thresholds) stored on in the system 200.

In another embodiment, the positioning module 124 can be configured to receive, obtain, generate, transmit, and/or store a location of the detected vehicle, client, or facility. For example, the management system 202 can be operably coupled with a global positioning system that can track a location of a client, such that when the detection module 122 detects the client, the positioning module 124 can receive a location of the client from the global positioning system. In another embodiment, the management system 202 can be operably coupled with sensors and other components that maintain a static location that can be transmitted amongst the system 200. For example, the detection module 122 can detect a vehicle via a coupled sensor, and upon detection, the positioning module 124 can receive a location from the coupled sensor. In another embodiment, the positioning module 124 can retrieve a plurality of stored locations corresponding to a plurality vehicles, cargo, sensors, beacons, clients, or other components that the positioning module 124 can associate with detections from the detection module 122. In another embodiment, the positioning module 124 can transmit a location, such as a location of a detected client and/or the proximity to a facility.

In another embodiment, the data capture module 126 can be configured to capture client-specific and/or vehicle-specific data. In one embodiment, the data capture module 126 can be in operable communication with a client and be configured to receive data, such as identification information, such as can be related to client identification, vehicle identification, driver identification, cargo identification, vendor identification, cargo destination, route taken by client, travel metrics of the client, speed of the client, travel history of the client, etc. In another embodiment, the data capture module 126 can be configured to communicate with the client or one or more components suitable to capture data related to a vehicle, such as camera, radar, etc. For example, the data capture module 126 can be coupled with a camera that can detect a serial number or a QR code of a vehicle or cargo or other identifying information. In another embodiment, the data capture module 126 can receive data from a sensor, such as an RFID sensor that can read data from an RFID chip, such as an RFID chip that can be associated with a vehicle or a cargo or other client. In another embodiment, the data capture module 126 can receive a transmission from a client indicating that a client has come into proximity of a wireless beacon. In one example, a transmission can include data related to a client; in another example, reception by the data capture module 126 of the transmission can cause the data capture module 126 to receive data from memory 104. In another example, the data capture module 126 can receive data from any sensor or sensors that can indicate information and/or data related to a client; in another embodiment, the data capture module 126 can be configured to receive data from a client related to the client. In another embodiment, the data capture module 126 can be configured to determine how long a client is within a particular area. For example, the data capture module 126 can time how long a client is within a proximity threshold.

In another embodiment, the authorization module 128 can be configured to receive data (such as identification information that can be received by the data capture module 126) and compare the received data with data already stored and available to the authorization module 128. In one embodiment, the authorization module 128 can receive data from a client regarding, e.g., client identification, vehicle identification, and cargo identification, and compare the received data with a record containing data related to, e.g., which client should be in which vehicle carrying which cargo. In one embodiment, the authorization module 128 can cross check received data with record data to ensure that a client should properly be granted access to a facility. For example, the authorization module 128 can check credentials of a client against a record to determine whether the client should be granted permission to enter. In another embodiment, the authorization module 128 can check personnel identification against a record to ensure that the proper personnel is in control of a given client or cargo. In another embodiment, the authorization module 128 can be configured to receive visual data, such as from a camera, and utilize optical character recognition, facial recognition, or any other suitable technology to ensure that a vehicle, person, and/or cargo is authorized to enter or have properly arrived at a given facility. In another embodiment, the authorization module 128 can be configured to perform any steps, analyses, or functions to determine when a client, associated driver, and/or associated cargo should be granted access to a facility.

In another embodiment, the authentication module 128 can authenticate a user on a client, such as a mobile phone 108, laptop 116, tablet 112, on-board device 110, vehicle 110, desktop 114, wearable device, or other suitable device. In one exemplary embodiment, the authentication module 128 can authenticate a user or session using a username, password, authentication token, biometric, or other suitable attribute received from the client. In another exemplary embodiment, the authentication module 128 can generate an authentication token for a particular user, session, or request. In one exemplary embodiment, the authentication module 128 can generate an authentication token using user data stored in the client. For example, a user can access a client and/or the facility management system by providing valid credentials via a login page or screen, including a username and password, biometrics, multi-factor authentication, or other suitable credential, such credentials, along with a user's information such as name, username, employee number, etc., can be stored in the client or server. In another exemplary embodiment, the authentication module 128 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In another exemplary embodiment, the authentication token can allow for single sign-on authentication to the server and/or memory from the client.

In another embodiment, the management system 200 can include a supervisor system 204. The supervisor system 204 can include a cargo management module 130 and a fleet management module 132. In one embodiment, the cargo management module 130 can be configured to account for cargo that is or will be within a facility and determine where the cargo is and/or where it should. In one embodiment, the supervisor system 204 can be in operable communication with the data collection 202, such that the cargo management module 130 can receive data from the data collection system 202. In another embodiment, the cargo management module 130 can utilize data received from the data collection system 202 to determine which cargo is to be allocated to a particular client, determine where the cargo is located, determine if the cargo is accessible at its current location, determine where to move the cargo to make it accessible, and/or generate prompts and/or notifications regarding the cargo's location and/or movement. In another embodiment, the cargo management module 130 can be configured to recognize a cargo associated with a particular client, determine where the cargo is to be ultimately delivered to, determine if the delivery location is available, determine where to place the cargo if the delivery location is unavailable, and/or generate prompts and/or notifications regarding the delivery location and/or movement of the delivery location.

In another embodiment, the supervisor system 204 can include a fleet management module 132. In one embodiment, the fleet management module 132 can be in operable communication with the data collection system 202 and/or one or more clients. In another embodiment, the fleet management module 132 can be to configured generate prompts and/or notifications regarding a position of a client of a fleet. In another embodiment, the fleet management module 132 can be configured to interface with a client to facilitate information exchange between a client and the management system 200. In another embodiment, the fleet management module 132 can be configured inform a client of a potential delay, roadblock, or other hazard related to the client and/or delivery. In another embodiment, the fleet management module 132 can be configured to determine one or more paths to a given location, such as a delivery location; in another embodiment, the fleet management module 132 can be configured to transmit the paths to a client. For example, the fleet management module 132 can have access to, e.g., a map of one or more intermodal facilities, such that the fleet management module 132 can determine driving lanes in which a vehicle can travel, pickup locations, delivery locations, access points, exit points, etc.

In another embodiment, the intermodal facility management system 200 can include a facility analytics system 206. In one embodiment, the facility analytics system 206 can include a tracing module 134 and a forecasting module 136. In one embodiment, the tracing module 134 can be configured to track a client in motion. For example, the tracing module 134 can be configured to receive data from a client in response to the client coming within proximity of a wireless beacon, receive further data when the client travels to be within proximity of a second wireless beacon, and then utilize known geographical, facility, or infrastructure data to determine an actual path that the client took and/or is taking to get from the first wireless beacon to the second wireless beacon. In another example, the tracing module 134 can have access to data indicating that wireless beacons are, for example, along a road, and further determine that a client utilized the road to travel from a first to a second beacon, as opposed to taking a straight line directly from the first to the second beacon. In another embodiment, the tracing module 134 can utilize GPS data to track or trace a path taken by a client. In another embodiment, the tracing module 134 can utilize any suitable data or infrastructure to determine an actual path being taken by a client.

In another embodiment, the tracing module 134 can compare a traced path to a path determined by, e.g., the fleet management module 132. For example, the fleet management module 132 can predetermine a path and transmit the path to a client. As the client travels to the destination, the tracing module 134 can trace the path the client is taking. In one embodiment, if the traced path conforms with the predetermined path, the tracing module 134 can continue tracing. In another embodiment, if the traced path does not conform with the predetermined path, the tracing module 134 can generate a directional prompt and/or notification indicating to the client a direction the client should go to realign with the predetermined path. In another embodiment, the tracing module 134 can indicate to the fleet management module 132 that such a prompt should be made. In another embodiment, the tracing module 134 can receive and store measurements related to client travel, such as speed, time, stationary time, etc. In another embodiment, the tracing module 134 can receive predetermined paths from the fleet management module 132, further receive data related to client travel on such predetermined paths, and then determine that one path should be taken instead of a different path, such as because of increase traffic of one path. For example, the tracing module 134 can determine that numerous clients are currently traveling on a particular path, and decide that a subsequent client should take a different path. In another embodiment, the tracing module 134 can receive data reflecting that there is an obstruction on a path, and determine to prompt a client to take a different path. In another embodiment, the tracing module 134 can receive data indicating that clients that have taken a particular path have taken longer to arrive at a given destination that was predicted (e.g., by the forecasting module 136), and therefore prompt a next client to take a different path.

In another embodiment, the management system can include a forecasting module 136. In one embodiment, the forecasting module can be configured to receive data from the data collection system 202 and/or the supervisor system 204. In one embodiment, the forecasting module 136 can be configured to utilize received data to predict a time of arrival of a client to a given facility. For example, and in one embodiment, the forecasting module 136 can receive a client location and estimate how long it will be until the client will arrive at a facility. In another embodiment, the forecasting module 136 can receive data related to how long one or more clients spends at, e.g., an access point (such as a gated access point) to a facility, and utilize the data in determining an estimated time of arrival to a given location, such as a delivery location or a pickup location. For example, the forecasting module 136 can receive data from a plurality of clients that travel through an access point and determine an average access point delay. In another example, the forecasting module 136 can utilize the calculated average access point delay and a received location of the client to then determine an estimated time of arrival.

Figure 3:
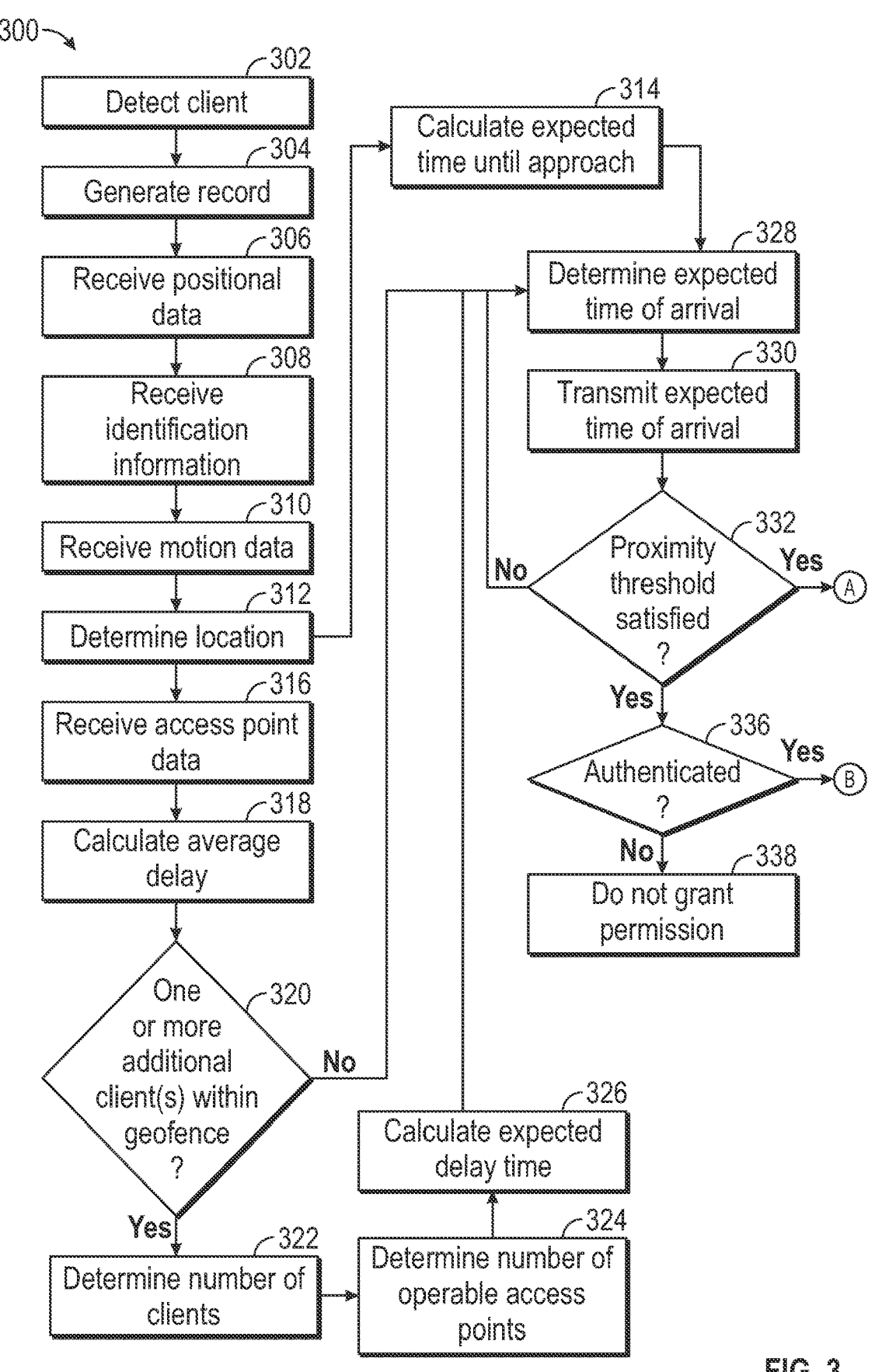
FIG. 3 illustrates a flowchart exemplifying facility management system flow control logic, in accordance with one or more exemplary embodiments of the present disclosure.
Figure 3:
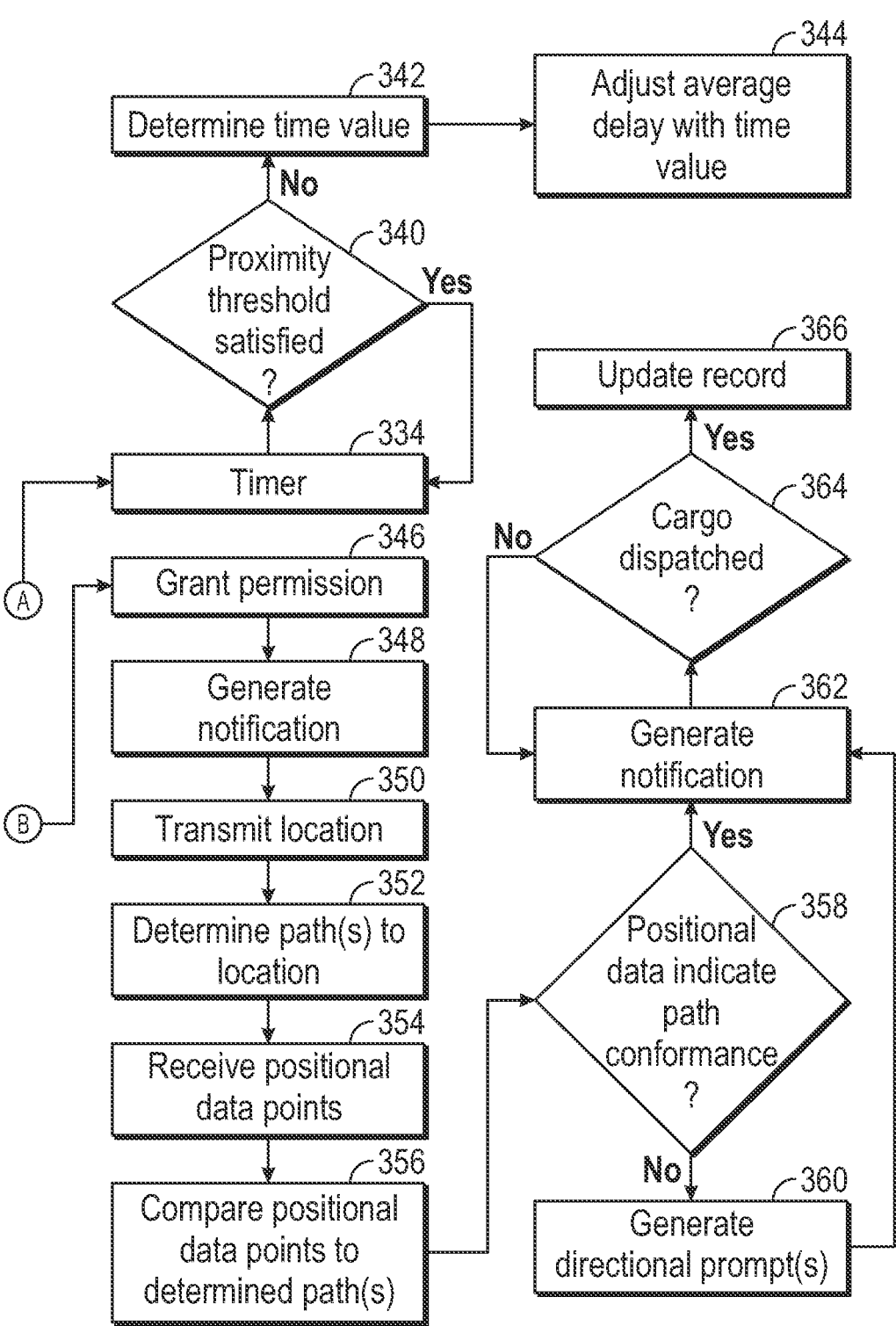

FIG. 3 illustrates a flow chart diagram 300 exemplifying control logic embodying features of a method of managing an intermodal facility in accordance with an exemplary embodiment of the present disclosure. The facility management system control logic 300 can be implemented as an algorithm on a server (e.g., server 102), a machine learning module, or other suitable system. Additionally, the facility management control logic 300 can implement or incorporate one or more features of the intermodal facility management system 200, including the data collection system 202 (with corresponding modules 122, 124, 126, and 128), supervisor system 204 (with corresponding modules 130 and 132), and facility analytics system 206 (with corresponding modules 134 and 136). The facility management control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The facility management control logic 300 can leverage the ability of a computer platform to spawn multiple processes and threads by processing data simultaneously. The speed and efficiency of the facility management control logic 300 is greatly improved by instantiating more than one process to facilitate efficiency maximization and traffic control in relation to cargo delivery and allocation in a given facility. However, one skilled in the art of programming will appreciate that use of a single processing thread may also be utilized and is within the scope of the present disclosure.

The facility management control logic 300 process flow of the present embodiment begins at step 302, wherein the control logic detects a client. For example, a client can be a mobile device associated with a particular driver operating a particular vehicle and allocated a particular cargo, and when the client comes within a certain radius of a wireless beacon, the control logic 300 can detect the client. In one embodiment, the client can transmit an indication to the control logic 300 that it is near a particular beacon; in another embodiment, wireless beacon can transmit an indication to the control logic 300 that a particular client is nearby. In another embodiment, the control logic 300 and a client can communicate via a network, and the control logic 300 can detect the client without use of a beacon. In another embodiment, the control logic 300 can be in operable communication with any sensors or other components suitable to detect a client, including motion sensors, cameras, RFID readers, radars, LIDAR, etc. The control logic then proceeds to step 304.

At step 304, the control logic 300 can generate a record. In one embodiment, a record can be configured to include identification information (such as identification information received at step 308) related to the detected client, including, but not limited to, client identification, vehicle identification, driver identification, cargo identification, vendor identification, cargo destination, route taken by client, travel metrics of the client, speed of the client, travel history of the client, date of detection, time of detection, etc. In another embodiment, a record can indicate an instance in which a client was detected by the control logic 300. In another embodiment, the identification information can take the form of a work order, such as a word order transmitted from a client to the control logic 300, or from another system to the control logic 300. The control logic 300 then proceeds to step 306.

At step 306, the control logic 300 can receive positional data, such as positional data related to one or more clients. In one embodiment, the control logic 300 can receive positional data from a client that it is in operable communication with via a network. Preferably, the client can transmit positional data to the control logic 300 when the client comes within a proximity of a wireless beacon. In another embodiment, a client can transmit positional data to the control logic 300 without involvement of a beacon. In another embodiment, the control logic 300 can triangulate a position of a client using one or more wireless beacons. In another embodiment, the control logic 300 can triangulate a position of a client using GPS. In another embodiment, the control logic 300 can utilize wireless communication to receive positional data of a client. In another embodiment, the positional data can be data relating to a geographical location of a client. The control logic 300 then proceeds to step 308.

At step 308, the control logic 300 can receive identification information. In one embodiment, the control logic 300 can store the information received at step 308 in the record generated at step 304. Preferably, the identification information can relate to the client, personnel, vehicle, cargo being carried, and/or cargo to be picked up. In another embodiment, the identification information can be any information suitable to identify a client, cargo, vehicle, load, vendor, or any other object or entity, such as a pin, IP address, MAC address, name, passcode, or any other information. The control logic 300 then proceeds to step 310.

At step 310, the control logic 300 can receive motion data. In one embodiment, the motion data can be related to motion of the client. In another embodiment, the motion data can include, but is not limited to, speed, direction, momentum, force, time, and/or any other data suitable to describe motion of a client and/or a vehicle related to the client. The control logic 300 then proceeds to step 312.

At step 312, the control logic 300 can determine a location of a client. In one embodiment, the control logic 300 can receive a location from a client. In another embodiment, the control logic 300 can utilize GPS or other method to determine a location of a client. In another embodiment, the control logic 300 can receive an indication from a client that the client is within a proximity of a wireless beacon and utilize this data to determine a location of a client. In another embodiment, the control logic 300 can utilize an indication from one or more clients that it is or has come within proximity of one or more wireless beacons to determine a location of a client. The control logic 300 then proceeds to step 314 or step 316.

At step 314, the control logic 300 can calculate an expected time until approach. In one embodiment, an expected time until approach can include a time until a client comes within a certain range from, e.g., an access point, such as an access point to an intermodal facility. In another embodiment, the expected time until approach can include how long the control logic 300 expects it will take the client to arrive at an access point. In another embodiment, the expected time until approach can include how long the control logic 300 expects it will take until the client arrives at a line of clients extending from an access point, such as if the client must wait behind a number of other clients before reaching the access point. In another embodiment, the control logic 300 can utilize the data collected at any of the previous steps to calculate an expected time until approach. In one embodiment, the control logic 300 can utilize the positional data to determine how far from an access point the client is. In another embodiment, the control logic 300 can utilized the motion data received at step 310 to determine a rate at which the client is moving. In another embodiment, the control logic 300 can utilize the data collected at steps 312 and 310 to perform a calculation to arrive at a time. This time, in one embodiment, can be an expected time until approach. The control logic 300 then proceeds to step 328.

At step 316, the control logic 300 can receive data related to an access point, such as an access point of an intermodal facility. In one embodiment, the control logic 300 can receive data related to the number of gates, lanes, or other division available and open. For example, an access point can refer to a particular gate available at an entrance to a facility. In another example, an access point can refer to the entrance itself, comprising multiple gates, lanes, or other divisions. For example, an access point can include multiple gates through which a client can access a facility. The control logic 300 can receive data that can indicate how many of these gates are operational. In another embodiment, the control logic 300 can receive data related to how congested a particular access point is. For example, the control logic 300 can receive data indicating that multiple other clients are within a certain proximity of the access point, and therefore determine that an access point is congested or could cause a delay. In another embodiment, the control logic 300 can receive data related to an identification of an access point, such as an access point name, number, or other identifier. The control logic 300 then proceeds to step 318.

At step 318, the control logic 300 can calculate an average delay. In one embodiment, the average delay can be an average access point delay, e.g. an amount of time that a client spends motionless at an access point on average. In one embodiment, the control logic 300 can utilize data received at step 316 or other received data to determine on average how long a client is motionless at an access point. For example, the control logic 300 can be receiving data from numerous clients that can be passing through a given access point, and from this data, the control logic 300 can determine an average delay. In another embodiment, the control logic 300 can determine how long on average a client waits at a gate to be authorized. For example, an access point can have multiple wireless beacons positioned before and after every gate within the access point. In one embodiment, if a client is, for example, between a wireless beacon at the beginning of a gate and at an end of a gate, the control logic 300 can determine how long the client is between those two wireless beacons. In another embodiment, any number of wireless beacons can be used. And another embodiment, the control logic 300 can calculate an average delay without the use of wireless beacons. For example, the control logic 300 can utilize RFID, GPS, radar, motion sensors, cameras, or any other mechanism suitable to detect when and how long a client is within a certain area. The control logic then proceeds to step 320.

At step 320, the control logic 300 can determine whether one or more additional clients are within a geofence. In one embodiment, a geofence can be an area surrounding an access point such that when a client comes within that area, the control logic 300 can be configured to recognize that a client has come within that area. In one embodiment, a geofence can be established by GPS or other positional technology. In another embodiment, a geofence can be established using a wireless beacon. For example, a wireless beacon can be configured to broadcast up to a particular radius, and when a client comes within that radius, the client can indicate to the control logic 300 that it has come within proximity of the wireless beacon. In another embodiment, if the client leaves a radius of a wireless beacon, the control logic 300 can determine that the client is no longer within the geofence. In one embodiment, the control logic 300 can determine whether one or more clients are within the geofence as one or more other clients are approaching the geofence. If there are one or more additional clients within the geofence, the control logic 300 then proceeds to step 322. If there are not one or more additional clients within the geofence, the control logic 300 then proceeds to step 328.

At step 322, the control logic 300 can determine a number of clients within a given geofence. The control logic then proceeds to step 324.

At step 324, the control logic 300 can determine a number of operable access points. For example, the control logic 300 can utilized data received at step 316 to determine if a given access point is available. In one embodiment, the control logic 300 can determine if multiple lanes, gates, or other divisions or open in a particular access point. At another embodiment, the control logic 300 can determine whether multiple different access points around a given facility or operational. In one embodiment, the control logic 300 can prompt a client to redirect to a particular operable access point if another access point is not operational or congested. The control logic 300 then proceeds to step 326.

At step 326, the control logic 300 can calculate an expected delay time. In one embodiment, the control logic 300 can utilized the data received at any of the previous steps to calculate the expected delay time. For example, the control logic 300 can utilize the data received at step 316, step 318, step 322, and step 324 to determine how long the control logic 300 expects an incoming client to be delayed at a given access point. For example, the control logic can perform a calculation with the average delay and the number of clients within a geofence to arrive at an expected delay for an approaching client. For example, the control logic 300 can determine that a client is delayed at an access point on average by sixteen seconds. The control logic 300 can then determine that there are five other clients within the geofence. The control logic 300 can then perform a calculation to determine that an expected delay time can be eighty seconds. In another embodiment, the control logic 300 can utilize any number of error adjustments or other normalizers to arrive at a more accurate result. In another embodiment, the control logic 300 can further consider a number of operable access points in determining an expected delay time. For example, the control logic 300 can divide the result of the operation of the average delay multiplied by the number of clients within the geofence by the number of operable access points. In this manner, the control logic 300 can adjust an expected delay time in accordance with the data received at any of steps 302 through 324. The control logic 300 then proceeds to step 328.

At step 328, the control logic 300 can determine an expected time of arrival. In one embodiment, the expected time of arrival can refer to the time at which the control logic 300 expects a client to arrive at a delivery or pickup location. In one embodiment, the control logic 300 can utilize data received or determined at any or all of steps 302 through 326 to determine the expected time of arrival. In one embodiment, the expected time of arrival can include an expected time until approach and an expected delay time. For example, the control logic 300 can add an expected time of approach to an expected delay time to arrive at an expected time of arrival. In another embodiment, the expected time of arrival can include an average delay and an expected time until approach. In another embodiment, an expected time of arrival can further include a time that the control logic 300 expects the client to take to travel from an access point to a delivery or a pickup location, such as after a client has successfully entered a facility. In another embodiment, an expected time of arrival can further include other factors, such as whether the client must first drop off carried cargo, receive service, or otherwise be delay before navigating to the destination location. The control logic 300 then proceeds to step 330.

At step 330, the control logic 300 can transmit the expected time of arrival. In one embodiment, the control logic 300 can transmit the expected time of arrival to one or more clients. Preferably, the control logic 300 can transmit the expected time of arrival to a first client associated with a delivery vehicle, and to a second client associated with a crane. In this manner, and as an example, the control logic 300 can inform both clients and the personnel related thereto of an expected timeline. In another embodiment, the control logic 300 can transmit the expected time of arrival to an access point or personnel associated with an access point. In another embodiment, the control logic 300 can transmit the expected time of arrival to any client or other component in operable communication with the network and/or the control logic 300. In another embodiment, the control logic 300 can continue to perform this step and any of the previous steps to continuously update and transmit an expected time of arrival in real time to any components in the network or system. The control logic 300 then proceeds to step 332.

At step 332, the control logic 300 can determine whether a proximity threshold has been satisfied. In one embodiment, the proximity threshold can be the same as the geofence discussed with respect to step 320. In another embodiment, the proximity threshold can be similar to the geofence discussed with respect to step 320. In another embodiment, the proximity threshold can be separate from the geofence discussed with respect to step 320. In another embodiment, the proximity threshold can refer to a distance from a certain point within which a client must be to satisfy the threshold. In another embodiment, the proximity threshold can refer to a radius around a central location. In another embodiment, a proximity threshold can refer to any suitable measure of proximity. Preferably, the proximity threshold can refer to an area having at least one outer boundary, and if a client exits the boundary, the proximity threshold can be no longer satisfied. For example, an access point can have at least one wireless beacon associated with it, and if a client comes within a particular radius from the wireless beacon, the client can satisfy the proximity threshold. In another embodiment, if the client exits the radius, the client can be considered to no longer satisfy the proximity threshold. In another embodiment, two wireless beacons can be used, such as at an entry and exit of a gate at an access point. In one embodiment, the client can be considered to satisfy the proximity threshold for as long as the client is between an area defined by the two wireless beacons. In another embodiment, if the client exits the area defined by the two wireless beacons, the client can be considered to no longer satisfy the proximity threshold. If the proximity threshold is satisfied, the control logic 300 then proceeds to step 334 or 336. If the proximity threshold is not satisfied, the control logic 300 then returns to step 328.

At step 334, the control logic 300 can perform a timer function. In one embodiment, a timer functionality can be initiated when the proximity threshold is first satisfied and continue until the proximity threshold is no longer satisfied. In this manner, the control logic 300 can determine a duration that the client satisfies the proximity threshold. In another embodiment, the control logic 300 can receive a time at which the client begins to satisfy the proximity threshold, an receive a time when the client ceases to satisfy the proximity threshold. The control logic 300 then proceeds to step 340.

At step 340, the control logic 300 can determine whether the proximity threshold is still satisfied. In this manner, and as an example, the control logic 300 can utilize the timer function to determine how long a client satisfies the proximity threshold. If the client satisfies the proximity threshold, the control logic 300 then proceeds back to step 334. If the client does not satisfy the proximity threshold, the control logic 300 then proceeds to step 342.

At step 342, the control logic 300 can determine a time value corresponding to a duration that the client satisfied the proximity threshold. The control logic 300 then proceeds to step 344.

At step 344, the control logic 300 can adjust the average delay calculated at step 318 with the time value generated at step 342. In this manner, and in one example, the control logic 300 can update the average delay for each client that passes through an access point. In this manner, and as an example, the control logic 300 can continuously generate updated an updated average delay or other updated metrics (such as an expected time of arrival) as multiple clients approach, access, and exit a facility. The control logic 300 can then terminate or await a new detection and can repeat the aforementioned steps.

At step 336, the control logic 300 can authenticate. In one embodiment, the control logic 300 can authenticate a client, such as to ensure that a token, passkey, pin, or any other security operator is recognized by the control logic 300. In another embodiment, the control logic 300 can authenticate an identity of an operator associated with the client. In another embodiment, the control logic 300 can authenticate a cargo associated with the client, such as a cargo being carried on a vehicle. In another embodiment, the control logic 300 can authenticate any identification information, such as identification information received at step 308. If authenticated, the control logic 300 then proceeds to step 346. If not authenticated, the control logic then proceeds to step 338.

At step 338, the control logic 300 can determine to not grant permission to a client. In one embodiment, if the client, driver, vendor, cargo, or other identification information is not authenticated at step 336, the control logic 300 can determine that permission should not be granted. In one embodiment, this permission can relate to accessing a facility, such that the control logic 300 can determine that a client should not have access to a facility. The control logic 300 can then terminate or await a new detection and can repeat the aforementioned steps.

At step 346, the control logic 300 can grant permission. In one embodiment, the control logic 300 can grant permission to a client to enter a facility. For example, the control logic 300 can determine that the client is properly arriving at a facility and, in one embodiment, raise a gate or otherwise de-obstruct a path to allow a vehicle and associated client to enter the facility. The control logic 300 then proceeds to step 348.

At step 348, the control logic 300 can generate a notification. In one embodiment, the control logic 300 can generate a notification to one or more clients indicating that a client was granted permission to enter the facility. In another embodiment, the control logic 300 can generate any other type of notification suitable to relay information to one or more clients. The control logic 300 then proceeds to step 350.

At step 350, the control logic 300 can transmit a location. In one embodiment, the control logic 300 can transmit, for example, a delivery location; in another embodiment, the control logic 300 can transmit a pickup location. In another embodiment, the control logic 300 can transmit a location to one or more clients in operable communication with the control logic 300. Preferably, the control logic 300 can be configured to transmit a destination location to a client that has been granted access to a facility, such as to indicate to the client where to go within a facility. In another embodiment, the control logic 300 can transmit any other desired location to one or more clients. The control logic 300 then proceeds to step 352.

At step 352, the control logic can determine one or more paths to the location transmitted at step 350. In one embodiment, the one or more paths can be the shortest distance to the location. In another embodiment, the one or more paths can be the quickest route to the location. In another embodiment, the control logic 300 can utilize data regarding a specific facility, such as the internal layout of the facility, to determine paths to a given location. In another embodiment, the control logic 300 can determine multiple paths. In another embodiment, the control logic 300 can consider intra-facility congestion, constructions delays, blockage, or any other type of scenario in determining a path or paths. In another embodiment, the control logic 300 can utilize data (such as positional data or motion data) received from one or more additional clients in determining one or more paths, such as to determine a level of congestion in a particular area. The control logic 300 then proceeds to step 354.

At step 354, the control logic 300 can receive positional data points. In one embodiment, positional data points can correspond to movement by a client. For example, as a client travels within a facility, the control logic 300 can receive data points corresponding to the client's travel. In another embodiment, one or more wireless beacons can be placed within a facility such that as a client travels within a facility, the wireless beacons can indicate or cause a client to indicate to the control logic 300 that a client is near the wireless beacon. In another embodiment, positional data points can be any data suitable to indicate to the control logic 300 a position or a group of positions that a client has moved to or within. The control logic 300 then proceeds to step 356.

At step 356, the control logic can compare the positional data points received at step 354 with the one or more paths determined at step 352. For example, the control logic 300 can map the positional data points against the known infrastructure of a given facility such that the control logic 300 can trace the actual path taken by a client. The control logic 300 then proceeds to step 358.

At step 358, the control logic 300 can determine whether the positional data points received at step 354 indicating an actual path taken by the client conform to the paths determined at step 352. In one embodiment, the control logic 300 can determine if the client is traveling along one of the paths determined at step 352. If the data points received at step 354 conform to at least one of the paths determined at step 352, the control logic then proceeds to step 362. If the positional data points received at step 354 do not conform with at least one of the paths determined at step 352, the control logic then proceeds to step 360.

At step 360, the control logic 300 can generate directional prompts. In one embodiment, the control logic 300 can indicate to one or more clients (preferably a client traveling to a destination location) that the client should change directions to conform to a determined path. In another embodiment, the control logic 300 can, for example, generate a prompt that can instruct a client to take a turn, continue straight, reverse, or perform some other navigational action. The control logic 300 then proceeds to step 362.

At step 362, the control logic 300 can generate a notification. In one embodiment, the notification can indicate to one or more clients that a client is arriving at a destination location or is otherwise en route to a destination location. In another embodiment, the notification generated at step 362 can include the expected time of arrival at the destination location. The control logic 300 then proceeds to step 364.

At step 364, the control logic 300 can determine whether cargo was dispatched. In one embodiment, cargo can be dispatched from a vehicle associated with a client. In another embodiment, cargo can be dispatched from the facility to a vehicle associated with a client. If the cargo is not dispatched, the control logic 300 then proceeds back to step 362. At step 362, the control logic 300 can generate a notification indicating that the cargo was not dispatched. If the cargo is dispatched, the control logic 300 then proceeds to step 366.

At step 366, the control logic 300 can update a record, such as the record generated at step 304. In one embodiment, updating the record can include indicating that a cargo was properly dispatched, a cargo was not dispatched, the time at which the client arrived at the destination location, the time at which a client received a cargo, or any other information related to the client, the cargo, or the facility. The control logic 300 can then terminate or await a new detection and can repeat the aforementioned steps.

Figure 4:
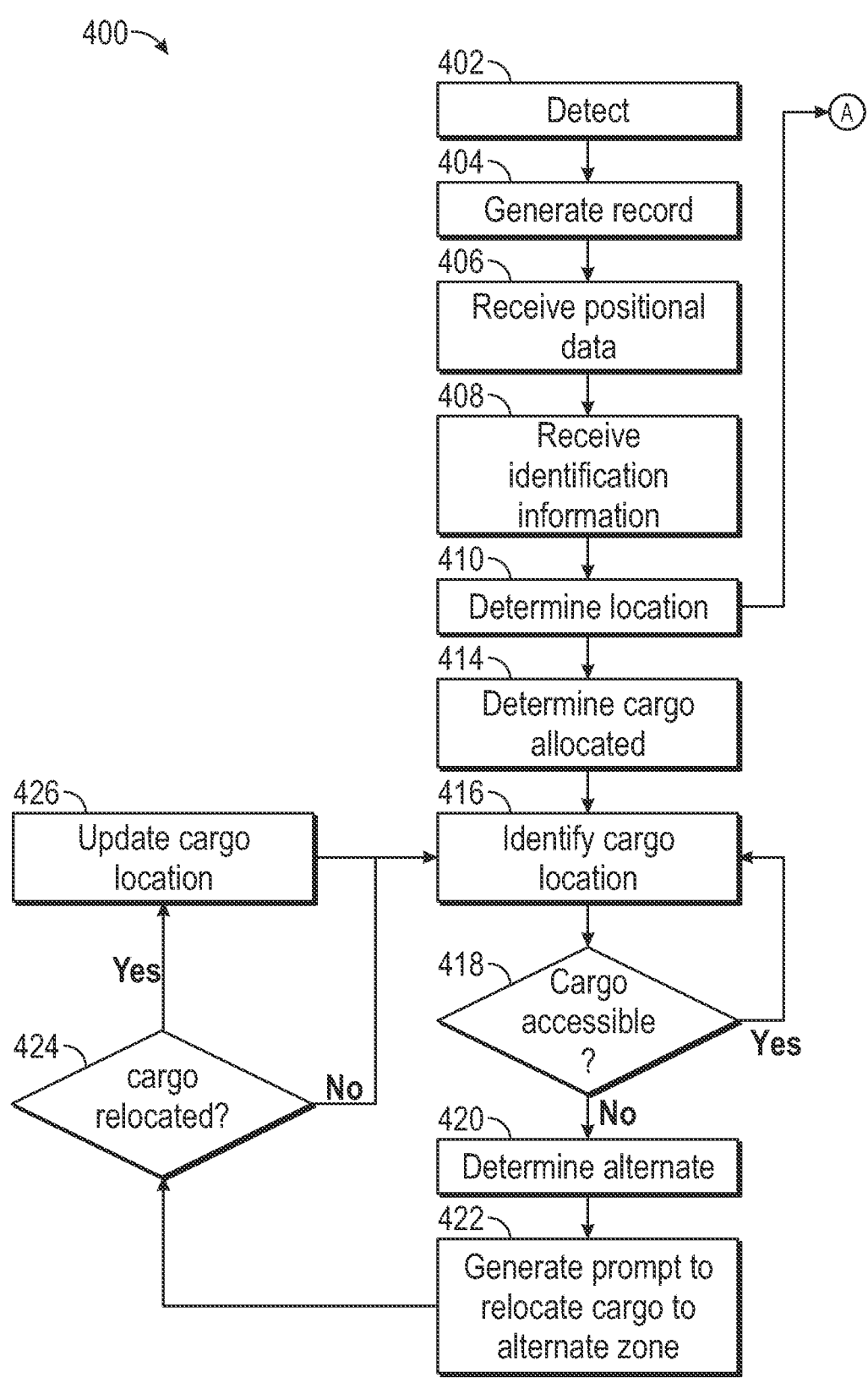
FIG. 4 illustrates a flowchart exemplifying cargo management system control logic, in accordance with one or more exemplary embodiments of the present disclosure.
Figure 4:
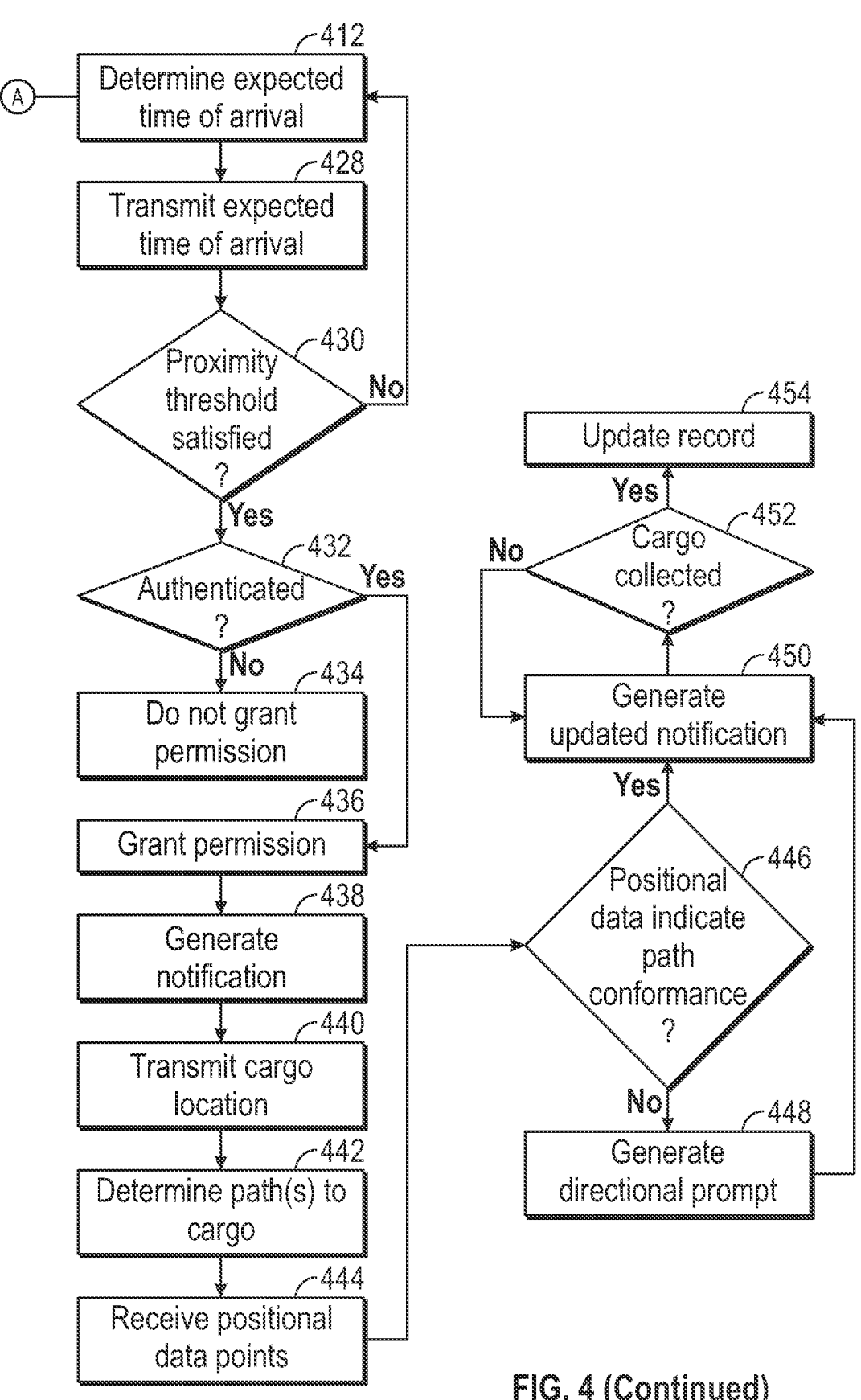

FIG. 4 illustrates a flow chart diagram 400 exemplifying control logic embodying features of a method of managing cargo in a facility in accordance with an exemplary embodiment of the present disclosure. The cargo management system control logic 400 can be implemented as an algorithm on a server (e.g., server 102), a machine learning module, or other suitable system. Additionally, the cargo management control logic 400 can implement or incorporate one or more features of the intermodal facility management system 200, including the data collection system 202 (with corresponding modules 122, 124, 126, and 128), supervisor system 204 (with corresponding modules 130 and 132), and facility analytics system 206 (with corresponding modules 134 and 136). The cargo management control logic 400 can be achieved with software, hardware, an application programming interface (API), a network connection, a network transfer protocol, HTML, DHTML, JavaScript, Dojo, Ruby, Rails, other suitable applications, or a suitable combination thereof.

The cargo management control logic 400 can leverage the ability of a computer platform to spawn multiple processes and threads by processing data simultaneously. The speed and efficiency of the cargo management control logic 400 is greatly improved by instantiating more than one process to facilitate efficiency maximization and traffic control in relation to cargo pickup and management in a given facility. However, one skilled in the art of programming will appreciate that use of a single processing thread may also be utilized and is within the scope of the present disclosure.

The cargo management control logic 400 process flow of the present embodiment begins at step 402, wherein the control logic detects a client. For example, a client can be a mobile device associated with a particular driver operating a particular vehicle and allocated a particular cargo, and when the client comes within a certain radius of a wireless beacon, the control logic 400 can detect the client. In one embodiment, the client can transmit an indication to the control logic 400 that it is near a particular beacon; in another embodiment, wireless beacon can transmit an indication to the control logic 400 that a particular client is nearby. In another embodiment, the control logic 400 and a client can communicate via a network, and the control logic 400 can detect the client without use of a beacon. In another embodiment, the control logic 400 can be in operable communication with any sensors or other components suitable to detect a client, including motion sensors, cameras, RFID readers, radars, LIDAR, etc. The control logic then proceeds to step 404.

At step 404, the control logic 400 can generate a record. In one embodiment, a record can be configured to include identification information (such as identification information received at step 408) related to the detected client, including, but not limited to, client identification, vehicle identification, driver identification, cargo identification, vendor identification, cargo destination, route taken by client, travel metrics of the client, speed of the client, travel history of the client, date of detection, time of detection, etc. In another embodiment, a record can indicate an instance in which a client was detected by the control logic 400. In another embodiment, the identification information can take the form of a work order, such as a word order transmitted from a client to the control logic 400, or from another system to the control logic 400. The control logic 400 then proceeds to step 406.

At step 406, the control logic 400 can receive positional data, such as positional data related to one or more clients. In one embodiment, the control logic 400 can receive positional data from a client that it is in operable communication with via a network. Preferably, the client can transmit positional data to the control logic 400 when the client comes within a proximity of a wireless beacon. In another embodiment, a client can transmit positional data to the control logic 400 without involvement of a beacon. In another embodiment, the control logic 400 can triangulate a position of a client using one or more wireless beacons. In another embodiment, the control logic 400 can triangulate a position of a client using GPS. In another embodiment, the control logic 400 can utilize wireless communication to receive positional data of a client. In another embodiment, the positional data can be data relating to a geographical location of a client. The control logic 400 then proceeds to step 408.

At step 408, the control logic 400 can receive identification information. In one embodiment, the control logic 400 can store the information received at step 408 in the record generated at step 404. Preferably, the identification information can relate to the client, personnel, vehicle, cargo being carried, and/or cargo to be picked up. In another embodiment, the identification information can be any information suitable to identify a client, cargo, vehicle, load, vendor, or any other object or entity, such as a pin, IP address, MAC address, name, passcode, or any other information. The control logic 400 then proceeds to step 410.

At step 410, the control logic 400 can determine a location of a client. In one embodiment, the control logic 400 can receive a location from a client. In another embodiment, the control logic 400 can utilize GPS or other method to determine a location of a client. In another embodiment, the control logic 400 can receive an indication from a client that the client is within a proximity of a wireless beacon and utilize this data to determine a location of a client. In another embodiment, the control logic 400 can utilize an indication from one or more clients that it is or has come within proximity of one or more wireless beacons to determine a location of a client. The control logic 400 then proceeds to step 412 and/or 414.

At step 414, the control logic 400 can determine a cargo allocated to a particular client. For example, the control logic 400 can receive data related to a vendor, shipping information, work order, purchase order, or any other information relevant to where cargo stored in a facility needs to go. In one embodiment, the control logic 400 can be in operable communication with a database (such as database 104) that can have stored therein information related to where cargo stored in a facility will be allocated. In another embodiment, the control logic 400 can receive an indication from a client regarding the cargo it is meant to receive. In one example, this information can then be authenticated later on at step 432. The control logic 400 then proceeds to step 416.

At step 416, the control logic 400 can identify a cargo location. In one embodiment, a cargo location can include a specific location of a cargo within a facility. For example, a cargo location can refer to a specific storage area, lane, level, or any other location identifying information. In one embodiment, the cargo location can include a specific truck spot to which a client can navigate to. In another embodiment, a cargo location can include a location of the cargo within a stack of multiple cargos, such that, for example, a crane operator can be made aware of where the cargo is located to facilitate hoisting the cargo in preparation for dispatch to pickup vehicle. The control logic 400 then proceeds to step 418.

At step 418, the control logic can determine whether the cargo is accessible. In one embodiment, the control logic 400 can determine whether the cargo it is accessible to be loaded onto a vehicle, or to be lifted by a crane, or both. In another embodiment, if the cargo location identified in step

416 indicates that the cargo is on a bottom level (e.g., the cargo is underneath other cargo), the control logic 400 can determine that the cargo is not accessible. In another embodiment, if the cargo location from step 416 indicates that the cargo is too far away from a crane designated to hoist and dispatch the cargo, the cargo can be considered to not be accessible. If the cargo is accessible, the control logic 400 then proceeds back to step 416 and identifies the location of the cargo. If the cargo is not accessible, the control logic 400 then proceeds to step 420.

At step 420, the control logic 400 can determine an alternate. In one embodiment, the alternate can be an alternative location or zone at which the cargo can be placed to be accessible for dispatch to a pickup vehicle. For example, the control logic 400 can determine a temporary placement zone or other alternate zone where the cargo can be relocated to facilitate dispatch of the cargo from the facility. The control logic then proceeds to step 422.

At step 422, the control logic 400 can generate a prompt to relocate the cargo to an alternate zone determined in step 420. For example, the control logic 400 can prompt a client associated with a crane operator to relocate the cargo such that it will be accessible to a pickup vehicle upon arrival. In another embodiment, the control logic 400 can generate a prompt to indicate to any other client or facility personnel that the cargo should be relocated to an alternate zone to facilitate dispatch of the cargo. The control logic 400 then proceeds to step 424.

At step 424, the control logic 400 can determine whether the cargo was relocated from the location initially identified at step 416. In one embodiment, if the cargo is relocated from its initial location to the alternate zone determined in step 420, the control logic 400 then proceeds to step 426. If the cargo is not relocated after the prompt generated in step 422, the control logic 400 then proceeds back to step 416 to identify the cargo location which can be used later in the process flow.

At step 426, the control logic 400 can update the cargo location. For example, if the cargo is relocated from the location initially identified at step 416 and positioned in the alternate zone determined in step 420, such as in response to the prompt generated at step 422, the control logic 400 can update the cargo location to indicate its position at the alternate zone. The control logic then proceeds to step 416 to identify the cargo location which can be used later in the process flow.

At step 412, the control logic 400 can determine an expected time of arrival. In one embodiment, the expected time of arrival can refer to the time at which the control logic 400 expects a client to arrive at a delivery or pickup location. In one embodiment, the control logic 400 can utilize data received or determined at any or all of steps 402 through 426 to determine the expected time of arrival. In one embodiment, the expected time of arrival can include an expected time until approach and an expected delay time. For example, the control logic 400 can add an expected time of approach to an expected delay time to arrive at an expected time of arrival. In another embodiment, the expected time of arrival can include an average delay and an expected time until approach. In another embodiment, an expected time of arrival can further include a time that the control logic 400 expects the client to take to travel from an access point to a delivery or a pickup location, such as after a client has successfully entered a facility. In another embodiment, an expected time of arrival can further include other factors, such as whether the client must first drop off carried cargo, receive service, or otherwise be delay before navigating to the destination location. The control logic 400 then proceeds to step 428.

At step 428, the control logic 400 can transmit the expected time of arrival. In one embodiment, the control logic 400 can transmit the expected time of arrival to one or more clients. Preferably, the control logic 400 can transmit the expected time of arrival to a first client associated with a delivery vehicle, and to a second client associated with a crane. In this manner, and as an example, the control logic 400 can inform both clients and the personnel related thereto of an expected timeline. In another embodiment, the control logic 400 can transmit the expected time of arrival to an access point or personnel associated with an access point. In another embodiment, the control logic 400 can transmit the expected time of arrival to any client or other component in operable communication with the network and/or the control logic 400. In another embodiment, the control logic 400 can continue to perform this teps and any of the previous steps to continuously update and transmit an expected time of arrival in real time to any components in the network or system. The control logic 400 then proceeds to step 430.

At step 430, the control logic 400 can determine whether a proximity threshold has been satisfied. In one embodiment, the proximity threshold can be the same as the geofence discussed with respect to step 320 above. In another embodiment, the proximity threshold can be similar to the geofence discussed with respect to step 320 above. In another embodiment, the proximity threshold can be separate from the geofence discussed with respect to step 320 above. In another embodiment, the proximity threshold can refer to a distance from a certain point within which a client must be to satisfy the threshold. In another embodiment, the proximity threshold can refer to a radius around a central location. In another embodiment, a proximity threshold can refer to any suitable measure of proximity. Preferably, the proximity threshold can refer to an area having at least one outer boundary, and if a client exits the boundary, the proximity threshold can be no longer satisfied. For example, an access point can have at least one wireless beacon associated with it, and if a client comes within a particular radius from the wireless beacon, the client can satisfy the proximity threshold. In another embodiment, if the client exits the radius, the client can be considered to no longer satisfy the proximity threshold. In another embodiment, two wireless beacons can be used, such as at an entry and exit of a gate at an access point. In one embodiment, the client can be considered to satisfy the proximity threshold for as long as the client is between an area defined by the two wireless beacons. In another embodiment, if the client exits the area defined by the two wireless beacons, the client can be considered to no longer satisfy the proximity threshold. If the proximity threshold is satisfied, the control logic 400 then proceeds to step 432. If the proximity threshold is not satisfied, the control logic 400 then returns to step 412.

At step 432, the control logic 400 can authenticate. In one embodiment, the control logic 400 can authenticate a client, such as to ensure that a token, passkey, pin, or any other security operator is recognized by the control logic 400. In another embodiment, the control logic 400 can authenticate an identity of an operator associated with the client. In another embodiment, the control logic 400 can authenticate a cargo associated with the client, such as a cargo being carried on a vehicle. In another embodiment, the control logic 400 can authenticate any identification information, such as identification information received at step 408. If authenticated, the control logic 400 then proceeds to step 436. If not authenticated, the control logic then proceeds to step 434.

At step 434, the control logic 400 can determine to not grant permission to a client. In one embodiment, if the client, driver, vendor, cargo, or other identification information is not authenticated at step 432, the control logic 400 can determine that permission should not be granted. In one embodiment, this permission can relate to accessing a facility, such that the control logic 400 can determine that a client should not have access to a facility. The control logic 400 can then terminate or await a new detection and can repeat the aforementioned steps.

At step 436, the control logic 400 can grant permission. In one embodiment, the control logic 400 can grant permission to a client to enter a facility. For example, the control logic 400 can determine that the client is properly arriving at a facility and, in one embodiment, raise a gate or otherwise de-obstruct a path to allow a vehicle and associated client to enter the facility. The control logic 400 then proceeds to step 438.

At step 438, the control logic 400 can generate a notification. In one embodiment, the control logic 400 can generate a notification to one or more clients indicating that a client was granted permission to enter the facility. In another embodiment, the control logic 400 can generate any other type of notification suitable to relay information to one or more clients. The control logic 400 then proceeds to step 440.

At step 440, the control logic 400 can transmit a location of a cargo, such as a cargo to be collected by a client. In one embodiment, the control logic 400 can transmit, for example, a pickup location. In another embodiment, the control logic 400 can transmit a cargo location to one or more clients in operable communication with the control logic 400. Preferably, the control logic 400 can be configured to transmit a cargo location to a client that has been granted access to a facility, such as to indicate to the client where to go within a facility. In another embodiment, the control logic 400 can transmit a cargo location to a client entering a facility and to a client associated with a crane, such that the vehicle and crane can utilize the location to facilitate a cargo exchange. The control logic 400 then proceeds to step 442.

At step 442, the control logic can determine one or more paths to the cargo location transmitted at step 440. In one embodiment, the one or more paths can be the shortest distance to the location. In another embodiment, the one or more paths can be the quickest route to the location. In another embodiment, the control logic 400 can utilize data regarding a specific facility, such as the internal layout of the facility, to determine paths to a given location. In another embodiment, the control logic 400 can determine multiple paths. In another embodiment, the control logic 400 can consider intra-facility congestion, constructions delays, blockage, or any other type of scenario in determining a path or paths. In another embodiment, the control logic 400 can utilize data (such as positional data or motion data) received from one or more additional clients in determining one or more paths, such as to determine a level of congestion in a particular area. The control logic 400 then proceeds to step 444.

At step 444, the control logic 400 can receive positional data points. In one embodiment, positional data points can correspond to movement by a client. For example, as a client travels within a facility, the control logic 400 can receive data points corresponding to the client's travel. In another embodiment, one or more wireless beacons can be placed within a facility such that as a client travels within a facility, the wireless beacons can indicate or cause a client to indicate to the control logic 400 that a client is near the wireless beacon. In another embodiment, positional data points can be any data suitable to indicate to the control logic 400 a position or a group of positions that a client has moved to or within. The control logic 400 then proceeds to step 446.

At step 446, the control logic 400 can determine whether the positional data points received at step 444 indicating an actual path taken by the client conform to the paths determined at step 442. For example, the control logic 400 can compare the positional data points received at step 444 with the one or more paths determined at step 442. For example, the control logic 400 can map the positional data points against the known infrastructure of a given facility such that the control logic 400 can trace the actual path taken by a client. In one embodiment, the control logic 400 can determine if the client is traveling along one of the paths determined at step 442. If the data points received at step 444 conform to at least one of the paths determined at step 442, the control logic then proceeds to step 450. If the positional data points received at step 444 do not conform with at least one of the paths determined at step 442, the control logic then proceeds to step 448.

At step 448, the control logic 400 can generate directional prompts. In one embodiment, the control logic 400 can indicate to one or more clients (preferably a client traveling to a destination location) that the client should change directions to conform to a determined path. In another embodiment, the control logic 400 can, for example, generate a prompt that can instruct a client to take a turn, continue straight, reverse, or perform some other navigational action. The control logic 400 then proceeds to step 450.

At step 450, the control logic 400 can generate an updated notification. In one embodiment, the control logic 400 can update the notification generated at step 438. In one embodiment, the notification can indicate to one or more clients that a client is arriving at a destination location or is otherwise en route to a destination location. In another embodiment, the notification generated at step 450 can include an updated expected time of arrival at the destination location. The control logic 400 then proceeds to step 452.

At step 452, the control logic 400 can determine whether cargo was collected. In another embodiment, cargo can be dispatched from the facility to a vehicle associated with a client and thereby be collected by the client. In another embodiment, if the cargo at the cargo location is successfully loaded onto a vehicle associated with a client, such as by a crane, the control logic 400 can determine that the cargo was collected. If the cargo is not collected, the control logic 400 then proceeds back to step 450 to generate an updated notification indicating that the cargo was not collected. If the cargo is collected, the control logic 400 then proceeds to step 454.

At step 454, the control logic 400 can update a record, such as the record generated at step 404. In one embodiment, updating the record can include indicating that a cargo was properly collected, a cargo was not collected, any incidents with the collection, the time at which the client arrived at the cargo location, the time at which a client collected a cargo, or any other information related to the client, the cargo, or the facility. The control logic 400 can then terminate or await a new detection and can repeat the aforementioned steps.

Figure 5:
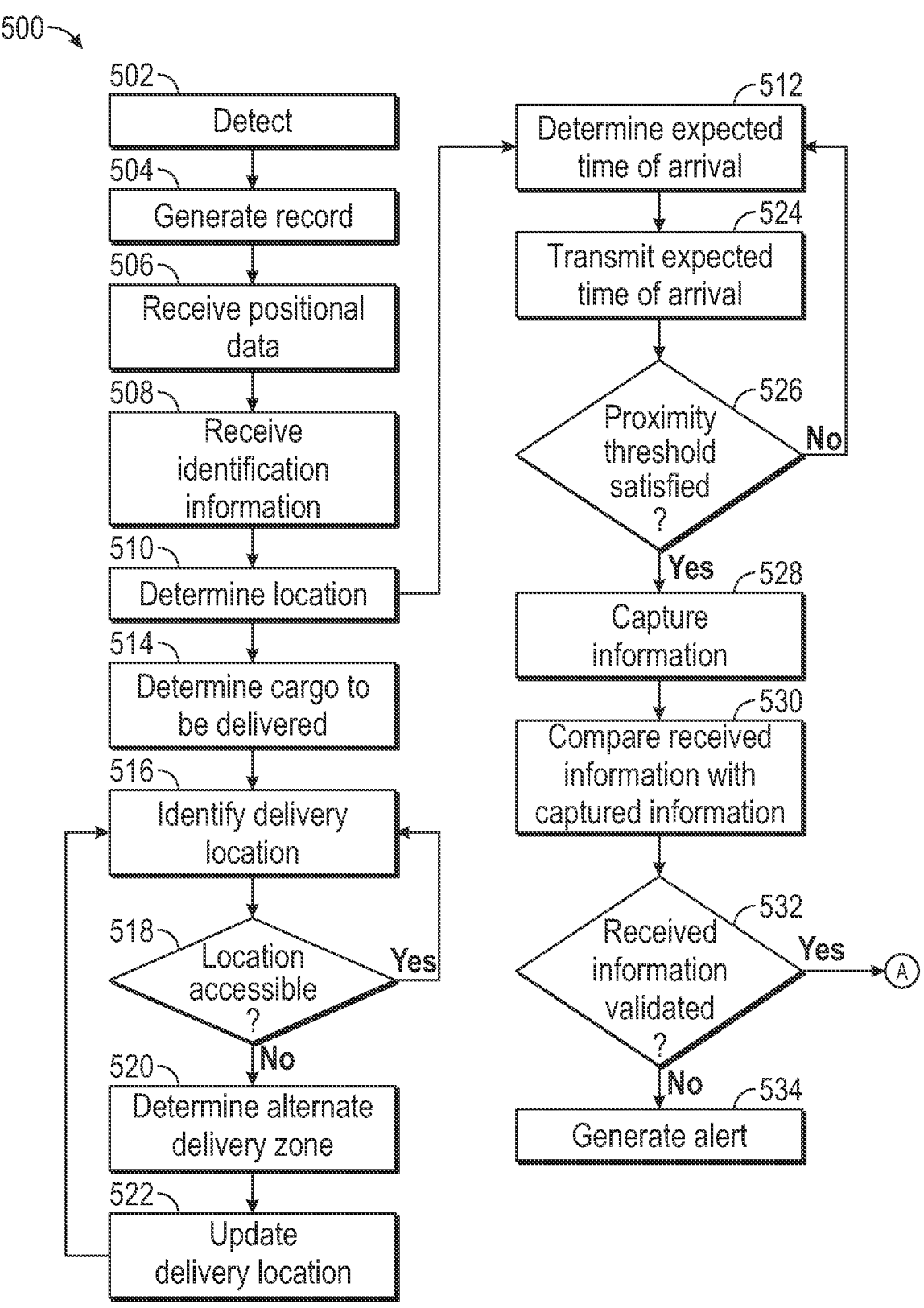
FIG. 5 illustrates a flowchart exemplifying cargo delivery system control logic, in accordance with one or more exemplary embodiments of the present disclosure.
Figure 5:
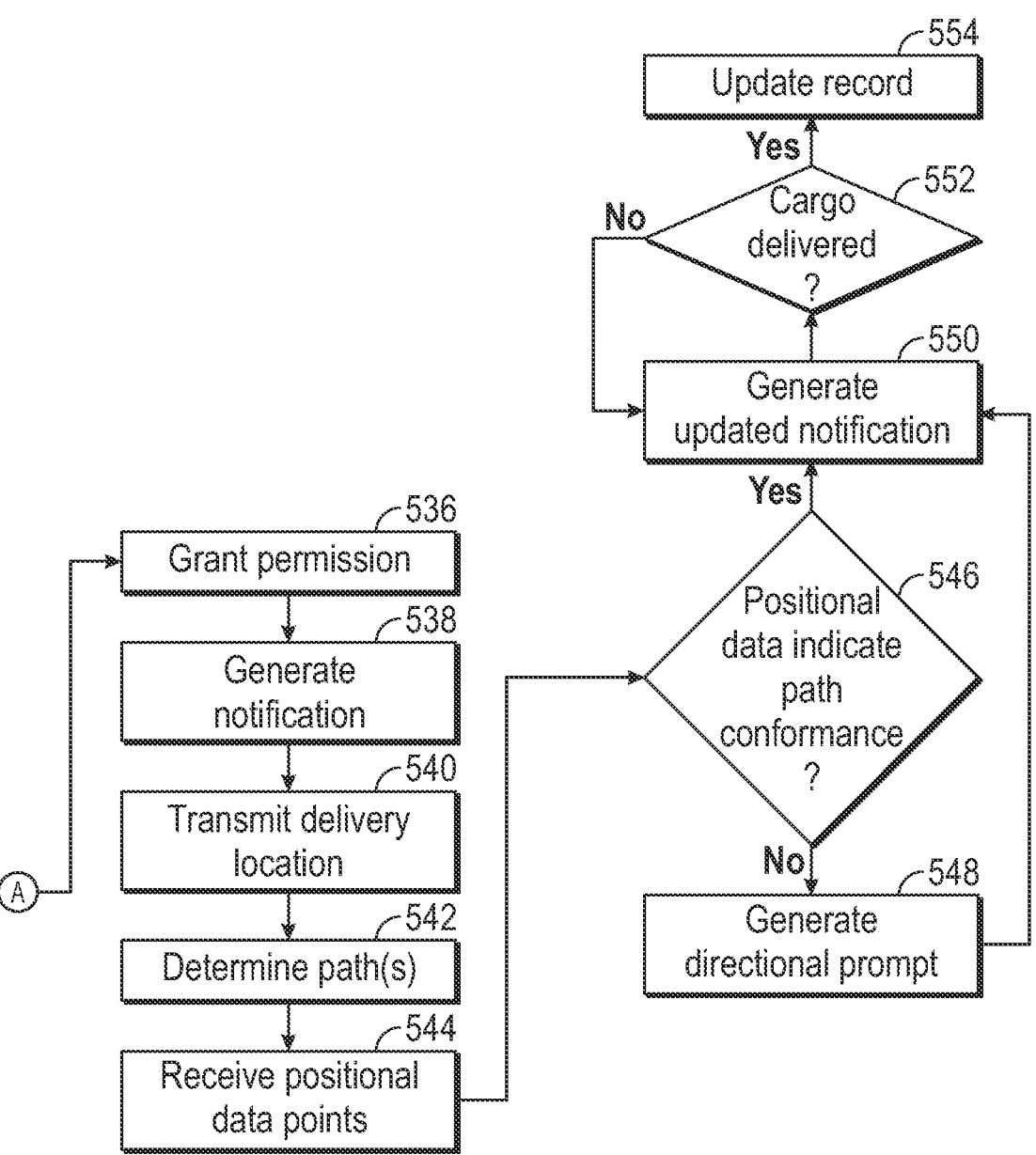

FIG. 5 illustrates a flow chart diagram 500 exemplifying control logic embodying features of a method of managing cargo delivery in accordance with an exemplary embodiment of the present disclosure. The cargo delivery system control logic 500 can be implemented as an algorithm on a server (e.g., server 102), a machine learning module, or other suitable system. Additionally, the cargo delivery control logic 500 can implement or incorporate one or more features of the intermodal facility management system 200, including the data collection system 202 (with corresponding modules 122, 124, 126, and 128), supervisor system 204 (with corresponding modules 130 and 132), and facility analytics system 206 (with corresponding modules 134 and 136). The cargo delivery control logic 500 can be achieved with software, hardware, an application programming interface (API), a network connection, a network transfer protocol, HTML, DHTML, JavaScript, Dojo, Ruby, Rails, other suitable applications, or a suitable combination thereof.

The cargo delivery control logic 500 can leverage the ability of a computer platform to spawn multiple processes and threads by processing data simultaneously. The speed and efficiency of the cargo delivery control logic 500 is greatly improved by instantiating more than one process to facilitate efficiency maximization and traffic control in relation to cargo delivery and allocation in a given facility. However, one skilled in the art of programming will appreciate that use of a single processing thread may also be utilized and is within the scope of the present disclosure.

The cargo delivery control logic 500 process flow of the present embodiment begins at step 502, wherein the control logic detects a client. For example, a client can be a mobile device associated with a particular driver operating a particular vehicle and allocated a particular cargo, and when the client comes within a certain radius of a wireless beacon, the control logic 500 can detect the client. In one embodiment, the client can transmit an indication to the control logic 500 that it is near a particular beacon; in another embodiment, wireless beacon can transmit an indication to the control logic 500 that a particular client is nearby. In another embodiment, the control logic 500 and a client can communicate via a network, and the control logic 500 can detect the client without use of a beacon. In another embodiment, the control logic 500 can be in operable communication with any sensors or other components suitable to detect a client, including motion sensors, cameras, RFID readers, radars, LIDAR, etc. The control logic then proceeds to step 504.

At step 504, the control logic 500 can generate a record. In one embodiment, a record can be configured to include identification information (such as identification information received at step 508) related to the detected client, including, but not limited to, client identification, vehicle identification, driver identification, cargo identification, vendor identification, cargo destination, route taken by client, travel metrics of the client, speed of the client, travel history of the client, date of detection, time of detection, etc. In another embodiment, a record can indicate an instance in which a client was detected by the control logic 500. In another embodiment, the identification information can take the form of a work order, such as a word order transmitted from a client to the control logic 500, or from another system to the control logic 500. The control logic 500 then proceeds to step 506.

At step 506, the control logic 500 can receive positional data, such as positional data related to one or more clients. In one embodiment, the control logic 500 can receive positional data from a client that it is in operable communication with via a network. Preferably, the client can transmit positional data to the control logic 500 when the client comes within a proximity of a wireless beacon. In another embodiment, a client can transmit positional data to the control logic 500 without involvement of a beacon. In another embodiment, the control logic 500 can triangulate a position of a client using one or more wireless beacons. In another embodiment, the control logic 500 can triangulate a position of a client using GPS. In another embodiment, the control logic 500 can utilize wireless communication to receive positional data of a client. In another embodiment, the positional data can be data relating to a geographical location of a client. The control logic 500 then proceeds to step 508.

At step 508, the control logic 500 can receive identification information. In one embodiment, the control logic 500 can store the information received at step 508 in the record generated at step 504. Preferably, the identification information can relate to the client, personnel, vehicle, cargo being carried, and/or cargo to be picked up. In another embodiment, the identification information can be any information suitable to identify a client, cargo, vehicle, load, vendor, or any other object or entity, such as a pin, IP address, MAC address, name, passcode, or any other information. The control logic 500 then proceeds to step 510.

At step 510, the control logic 500 can determine a location of a client. In one embodiment, the control logic 500 can receive a location from a client. In another embodiment, the control logic 500 can utilize GPS or other method to determine a location of a client. In another embodiment, the control logic 500 can receive an indication from a client that the client is within a proximity of a wireless beacon and utilize this data to determine a location of a client. In another embodiment, the control logic 500 can utilize an indication from one or more clients that it is or has come within proximity of one or more wireless beacons to determine a location of a client. The control logic 500 then proceeds to step 512 and/or 514.

At step 514, the control logic 500 can determine cargo to be delivered. For example, the control logic 500 can receive an indication from a client identifying the cargo being carried to the facility. In another embodiment, the control logic 500 can receive a work order indicating a cargo en route to be delivered a facility. In another embodiment, the control logic 500 can have access to data indicating that a particular cargo is associated with a particular client. The control logic 500 then proceeds to step 516.

At step 516, the control logic 500 can identify a delivery location. In one embodiment, the delivery location can be a storage space in a facility. In another embodiment, delivery location can be a freight car. In another embodiment, the delivery location can be any location suitable to receive a cargo. In another embodiment, the delivery location can be any location where the cargo is meant to be delivered. The control logic 500 then proceeds to step 518.

At step 518, the control logic 500 can determine whether the delivery location is accessible. In one embodiment, the location can be accessible if a cargo can be placed in the location, or if the location is prepared to receive the cargo. For example, if the delivery location is meant to be a rail car, but the rail car is loaded with freight that has yet to be unloaded, the control logic 500 can determine that the delivery location is inaccessible. If the delivery location is accessible, the control logic 500 then proceeds back to step 516 and identifies the delivery location which can be used later in the process flow. If the delivery location is not accessible, the control logic 500 then proceeds to step 520.

At step 520, the control logic 500 can determine an alternate delivery zone. In one embodiment, the control logic 500 can identify a space in a facility that is empty and can receive the cargo. In one embodiment, the control logic

500 can have access to information related to the facility, such as which spaces are filled and which spaces are empty. In another embodiment, the control logic 500 can receive information indicating which zones within a facility are available for cargo placement. In another embodiment, an alternate zone can be an alternative railcar. The control logic then proceeds to step 522.

At step 522, the control logic 500 can update the delivery location. For example, decontrol logic 500 can indicate that the delivery location is now at an alternate delivery zone if the initial delivery location was not accessible. The control logic then proceeds to step 516 to identify the delivery location which can be used later in the process flow.

At step 512, the control logic 500 can determine an expected time of arrival. In one embodiment, the expected time of arrival can refer to the time at which the control logic 500 expects a client to arrive at a delivery or pickup location. In one embodiment, the control logic 500 can utilize data received or determined at any or all of steps 502 through 522 to determine the expected time of arrival. In one embodiment, the expected time of arrival can include an expected time until approach and an expected delay time. For example, the control logic 500 can add an expected time of approach to an expected delay time to arrive at an expected time of arrival. In another embodiment, the expected time of arrival can include an average delay and an expected time until approach. In another embodiment, an expected time of arrival can further include a time that the control logic 500 expects the client to take to travel from an access point to a delivery or a pickup location, such as after a client has successfully entered a facility. In another embodiment, an expected time of arrival can further include other factors, such as whether the client must first drop off carried cargo, receive service, or otherwise be delay before navigating to the destination location. The control logic 500 then proceeds to step 524.

At step 524, the control logic 500 can transmit the expected time of arrival. In one embodiment, the control logic 500 can transmit the expected time of arrival to one or more clients. Preferably, the control logic 500 can transmit the expected time of arrival to a first client associated with a delivery vehicle, and to a second client associated with a crane. In this manner, and as an example, the control logic 500 can inform both clients and the personnel related thereto of an expected timeline. In another embodiment, the control logic 500 can transmit the expected time of arrival to an access point or personnel associated with an access point. In another embodiment, the control logic 500 can transmit the expected time of arrival to any client or other component in operable communication with the network and/or the control logic 500. In another embodiment, the control logic 500 can continue to perform this step and any of the previous steps to continuously update and transmit an expected time of arrival in real time to any components in the network or system. The control logic 500 then proceeds to step 526.

At step 526, the control logic 500 can determine whether a proximity threshold has been satisfied. In one embodiment, the proximity threshold can be the same as the geofence discussed with respect to step 320 above. In another embodiment, the proximity threshold can be similar to the geofence discussed with respect to step 320 above. In another embodiment, the proximity threshold can be separate from the geofence discussed with respect to step 320 above. In another embodiment, the proximity threshold can refer to a distance from a certain point within which a client must be to satisfy the threshold. In another embodiment, the proximity threshold can refer to a radius around a central location. In another embodiment, a proximity threshold can refer to any suitable measure of proximity. Preferably, the proximity threshold can refer to an area having at least one outer boundary, and if a client exits the boundary, the proximity threshold can be no longer satisfied. For example, an access point can have at least one wireless beacon associated with it, and if a client comes within a particular radius from the wireless beacon, the client can satisfy the proximity threshold. In another embodiment, if the client exits the radius, the client can be considered to no longer satisfy the proximity threshold. In another embodiment, two wireless beacons can be used, such as at an entry and exit of a gate at an access point. In one embodiment, the client can be considered to satisfy the proximity threshold for as long as the client is between an area defined by the two wireless beacons. In another embodiment, if the client exits the area defined by the two wireless beacons, the client can be considered to no longer satisfy the proximity threshold. If the proximity threshold is satisfied, the control logic 500 then proceeds to step 528. If the proximity threshold is not satisfied, the control logic 500 then returns to step 512.

At step 528, the control logic 500 can capture information. In one embodiment, the control logic 500 can capture information related to an identity of a client, a vehicle, personnel, cargo, or any other type of identification information or additional identification information. In one embodiment, the control logic 500 can utilize a camera, facial recognition software, optical character recognition software, or any other suitable mechanism to capture additional data. Preferably, the control logic 500 can capture information related to a cargo being carried by a client, such as a serial number, QR code, or other identifying information. The control logic 500 then proceeds to step 530.

At step 530, the control logic 500 can compare the information captured at 528 with the information received at step 508. For example, the control logic 500 can use a camera to capture a serial number or other identification number on a cargo and compare this information with information received regarding the cargo to ensure that the correct cargo is being carried by a given vehicle. In another embodiment, the control logic 500 can compare any other information captured at step 528 with the information received at step 508. In another embodiment, the control logic 500 can ensure that a vehicle is authorized to access a facility, such as by comparing license plate information with information in a record accessible by the control logic 500. The control logic 500 then proceeds to step 532.

At step 532, the control logic 500 can validate the information received at step 508 with the information captured at step 528. In one embodiment, the control logic 500 can determine whether the information received at step 508 matches the information captured at step 528. if the control logic 500 validates the received identification information with the captured information, the control logic 500 then proceeds to step 536. If the control logic 500 does not validate the received identification information, the control logic 500 then proceeds to step 534.

At step 534, the control logic can generate an alert. In one embodiment, the control logic 500 can alert personnel, clients, a facility, or any other component of the system that the received information from step 508 has not been validated. In this manner, and as an example, the control logic 500 can ensure that the proper cargo is being delivered to the proper location or facility. In another embodiment, the control logic 500 can provide security to a facility by validating entries and exits. The control logic 500 can then terminate or await a new detection and can repeat the aforementioned steps.

At step 536, the control logic 500 can grant permission. In one embodiment, the control logic 500 can grant permission to a client to enter a facility. In another embodiment, the control logic 500 can grant permission to exit a facility. For example, the control logic 500 can determine that the client is properly arriving at a facility and, in one embodiment, raise a gate or otherwise de-obstruct a path to allow a vehicle and associated client to enter the facility. In another embodiment, the control logic 500 can validate that the proper cargo is being carried by a proper client and is being carried to a proper location, and therefore allow a client to exit the facility, such as by raising a gate or otherwise de-obstructing a path to allow a vehicle and associated client to exit the facility. The control logic 500 then proceeds to step 538.

At step 538, the control logic 500 can generate a notification. In one embodiment, the control logic 500 can generate a notification to one or more clients indicating that a client was granted permission to enter the facility. In another embodiment, the control logic 500 can generate a notification indicating that a client has exited a facility. In another embodiment, the control logic 500 can generate any other type of notification suitable to relay information to one or more clients. The control logic 500 then proceeds to step 540.

At step 540, the control logic 500 can transmit a delivery location. For example, the control logic 500 can transmit the delivery location identified in step 516 to one or more clients. Preferably, the control logic 500 can transmit the delivery location to the client that is designated to deliver the cargo, such that the client and associated personnel are made aware of where to deliver the cargo. The control logic 500 then proceeds to step 542.

At step 542, the control logic can determine one or more paths to the delivery location transmitted at step 540. In one embodiment, the one or more paths can be the shortest distance to the location. In another embodiment, the one or more paths can be the quickest route to the location. In another embodiment, the control logic 500 can utilize data regarding a specific facility, such as the internal layout of the facility, to determine paths to a given location. In another embodiment, the control logic 500 can determine multiple paths. In another embodiment, the control logic 500 can consider intra-facility congestion, constructions delays, blockage, or any other type of scenario in determining a path or paths. In another embodiment, the control logic 500 can utilize data (such as positional data or motion data) received from one or more additional clients in determining one or more paths, such as to determine a level of congestion in a particular area. The control logic 500 then proceeds to step 544.

At step 544, the control logic 500 can receive positional data points. In one embodiment, positional data points can correspond to movement by a client. For example, as a client travels within a facility, the control logic 500 can receive data points corresponding to the client's travel. In another embodiment, one or more wireless beacons can be placed within a facility such that as a client travels within a facility, the wireless beacons can indicate or cause a client to indicate to the control logic 500 that a client is near the wireless beacon. In another embodiment, positional data points can be any data suitable to indicate to the control logic 500 a position or a group of positions that a client has moved to or within. The control logic 500 then proceeds to step 546.

At step 446, the control logic 500 can determine whether the positional data points received at step 544 indicating an actual path taken by the client conform to the paths determined at step 542. For example, the control logic 500 can compare the positional data points received at step 544 with the one or more paths determined at step 542. For example, the control logic 500 can map the positional data points against the known infrastructure of a given facility such that the control logic 500 can trace the actual path taken by a client. In one embodiment, the control logic 500 can determine if the client is traveling along one of the paths determined at step 542. If the data points received at step 544 conform to at least one of the paths determined at step 542, the control logic then proceeds to step 550. If the positional data points received at step 544 do not conform with at least one of the paths determined at step 542, the control logic then proceeds to step 548.

At step 548, the control logic 500 can generate directional prompts. In one embodiment, the control logic 500 can indicate to one or more clients (preferably a client traveling to a destination location) that the client should change directions to conform to a determined path. In another embodiment, the control logic 500 can, for example, generate a prompt that can instruct a client to take a turn, continue straight, reverse, or perform some other navigational action. The control logic 500 then proceeds to step 550.

At step 550, the control logic 500 can generate an updated notification. In one embodiment, the control logic 500 can update the notification generated at step 538. In one embodiment, the notification can indicate to one or more clients that a client is arriving at a destination location or is otherwise en route to a destination location. In another embodiment, the notification generated at step 550 can include an updated expected time of arrival at the delivery location. The control logic 500 then proceeds to step 552.

At step 552, the control logic 500 can determine whether the cargo was delivered to the delivery location. In one embodiment, the control logic 500 can receive an indication that the cargo has been dispatched from a delivery vehicle. In another embodiment, the control logic 500 can receive an indication that the cargo has been placed in the delivery location. If the cargo was not delivered, the control logic then proceeds back to step 550. If the cargo was delivered, the control logic 500 then proceeds to step 554.

At step 554, the control logic 500 can update a record, such as the record generated at step 504. In one embodiment, updating the record can include indicating that a cargo was properly collected, a cargo was not collected, any incidents with the collection, the time at which the client arrived at the cargo location, the time at which a client collected a cargo, or any other information related to the client, the cargo, or the facility. The control logic 500 can then terminate or await a new detection and can repeat the aforementioned steps.

Figure 6:
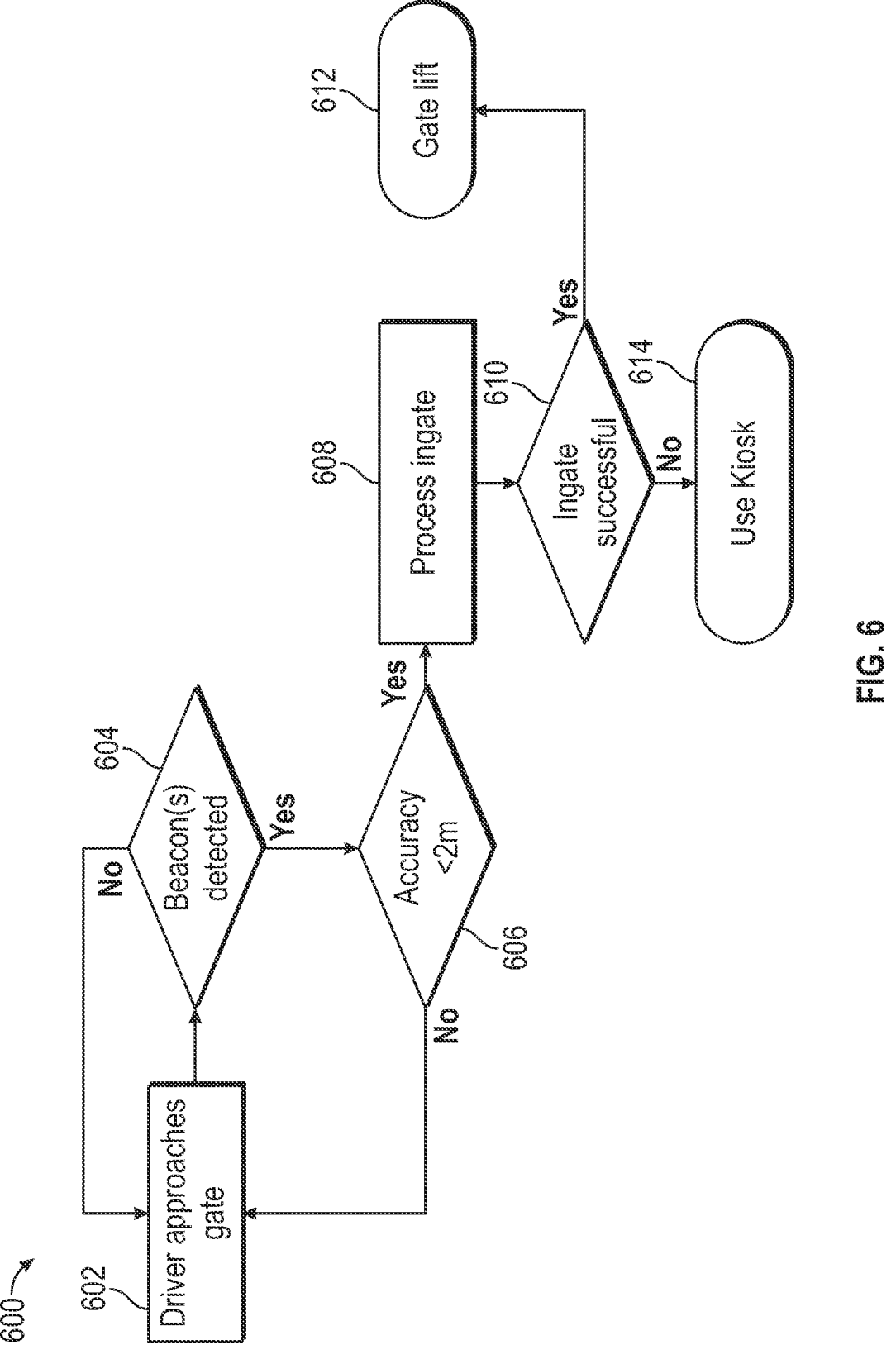
FIG. 6 illustrates a flowchart exemplifying fleet in-gating system control logic in accordance with one or more exemplary embodiments of the present disclosure.

FIG. 6 illustrates a flow chart diagram 600 exemplifying control logic embodying features of a method of fleet in-gating in accordance with an exemplary embodiment of the present disclosure. The fleet in-gating system control logic 600 can be implemented as an algorithm on a server (e.g., server 102), a machine learning module, or other suitable system. Additionally, the fleet in-gating control logic 600 can implement or incorporate one or more features of the intermodal facility management system 200, including the data collection system 202 (with corresponding modules 122, 124, 126, and 128), supervisor system 204 (with corresponding modules 130 and 132), and facility analytics system 206 (with corresponding modules 134 and

136). The fleet in-gating control logic 600 can be achieved with software, hardware, an application programming interface (API), a network connection, a network transfer protocol, HTML, DHTML, JavaScript, Dojo, Ruby, Rails, other suitable applications, or a suitable combination thereof.

The fleet in-gating control logic 600 can leverage the ability of a computer platform to spawn multiple processes and threads by processing data simultaneously. The speed and efficiency of the fleet in-gating control logic 600 is greatly improved by instantiating more than one process to facilitate efficiency maximization and traffic control in relation to fleet access and in-gating in a given facility. However, one skilled in the art of programming will appreciate that use of a single processing thread may also be utilized and is within the scope of the present disclosure.

The fleet in-gating control logic 600 process flow of the present embodiment begins at step 602, wherein a vehicle approaches a gate. In one embodiment, a gate can refer to a division of an access point. In another embodiment, a gate can refer to an access point. The control logic 600 then proceed to step 604.

At step 604, the control logic 600 can determine whether one or more wireless beacons have been detected. In one embodiment, the control logic 600 can receive an indication from a client that the client detects a wireless beacon within a certain range from the client. In another embodiment, the control logic 600 can receive an indication from a wireless beacon that a client has come within a certain range of the wireless beacon. In another embodiment, the control logic 500 can utilize cameras, RFID, or any other suitable mechanism to detect a beacon, or detect that a client has come within a range of a beacon. If the control logic 600 determines that one or more beacons were detected, the control logic proceeds to step 606. If the control logic 600 determines that one or more beacons were not detected, the control logic 600 then proceeds back to step 602.

At step 606, the control logic 600 can determine whether an accuracy of the beacon detection in step 604 is within less than two meters. In one embodiment, this determination can aid the control logic 600 in determining whether to admit a client to a facility. For example, if the beacon detection is not accurate within less than two meters, the control logic can determine that a client is too far away from a gate to be allowed access. If the control logic 600 determines that the accuracy of the beacon detection of step 604 is not within less than two meters, the control logic 600 then proceeds back to step 602. If the accuracy of the beacon detection at step 604 is within less than two meters (or otherwise satisfies an accuracy threshold), the control logic 600 then proceeds to step 608.

At step 608, the control logic 600 can process an in-gate of the client. in one embodiment, this process can include processing an authentication of an identity of a driver, a client, a vehicle, a vendor, a cargo, or any other identification information. The control logic 600 then proceeds to step 610.

At step 610, the control logic 600 can determine whether the client was in-gated successfully. In one embodiment, the control logic 600 can determine that the entity at the gate is properly allowable into a facility. In another embodiment, the control logic 600 can confirm that a client is carrying the correct cargo. If the in-gate is successful, the control logic 600 then proceeds to step 612. If the in-gate is not successful, the control logic 600 then proceeds to step 614.

At step 612, the control logic 600 can initiate a gate lift. In one embodiment, lifting of the gate can allow a client access to a facility. The control logic 600 can then terminate or await a new client approach and can repeat the aforementioned steps.

At step 614, a kiosk can be used to attempt to re-in-gate. For example, a driver associated with a client can use an intercom, QR code reader, pin code, keypad, or any other mechanism to attempt to authenticate itself to enable facility access. The control logic 600 can then terminate or await a new client approach and can repeat the aforementioned steps.

Figure 7:
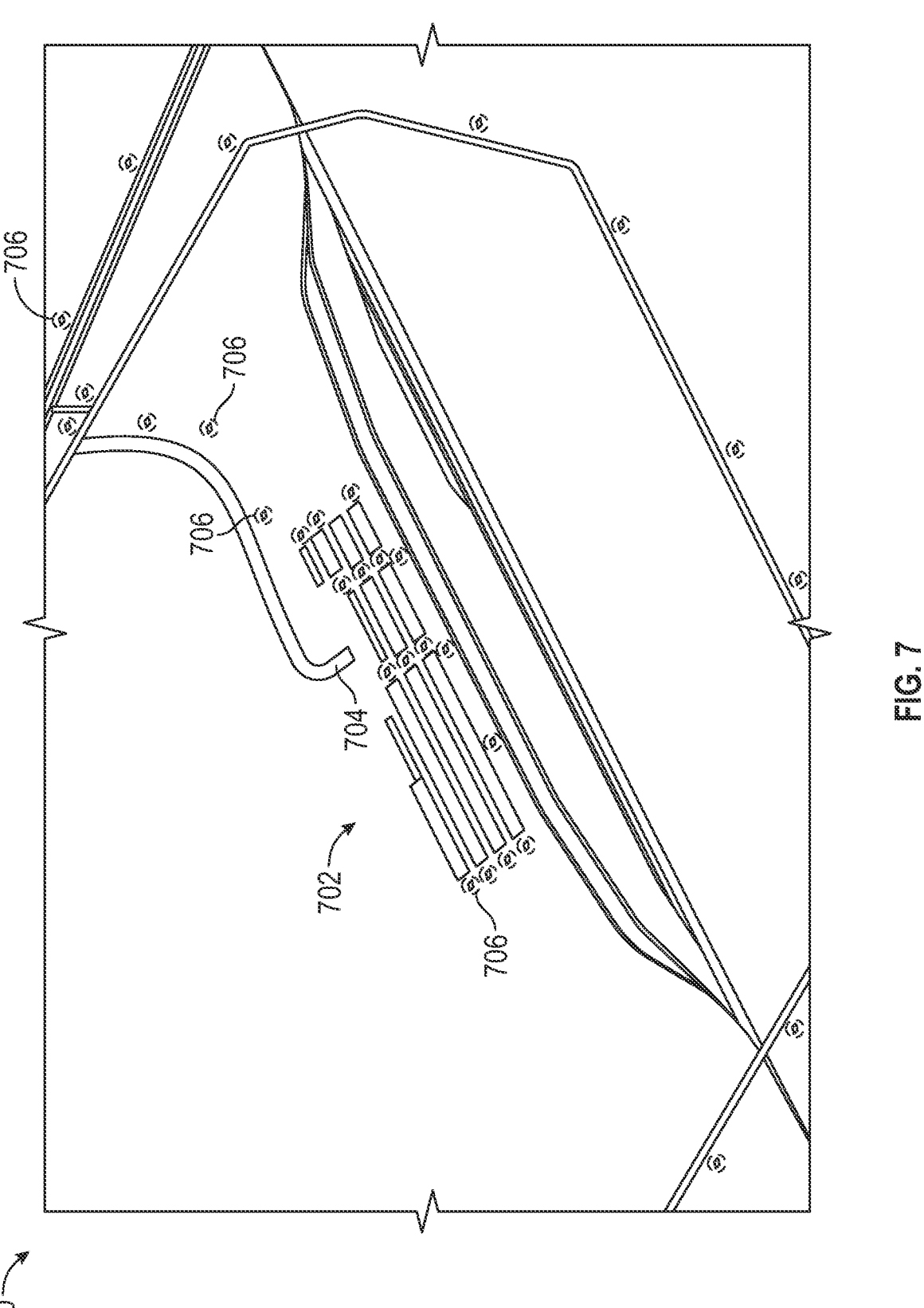
FIG. 7 illustrates an exemplary intermodal facility infrastructure in accordance with one or more exemplary embodiments of the present disclosure.

FIG. 7 depicts a perspective view of an intermodal facility infrastructure 700. In one embodiment, the intermodal facility infrastructure 700 can include an intermodal facility 702, at least one access point 704 to the intermodal facility 702, and a plurality of roads surrounding the facility 702. In another embodiment, the facility infrastructure 700 can further include a plurality of wireless beacons 706 placed strategically around the facility 702 and roads. For example, the wireless beacons 706 can be located on roads approaching the facility 702, highways around the facility 702, and within the facility 702 itself. Preferably, the wireless beacons are Bluetooth Low Energy beacons configured to interact with a client, e.g., a mobile device, such as a mobile phone, tablet, or on-board computer system of a vehicle. In one embodiment, the wireless beacons 706 can facilitate interaction between a client and a facilities management system in accordance with the principles of the present disclosure. For example, as a client travels past the wireless beacons 706, a facilities management system can receive an indication that a client has traveled past a particular beacon 706, indicating to the system the position of the client. Further, wireless beacons 706 can be disposed within an access point 704, such as to establish geofences and/or proximity thresholds in accordance with the principles of the present disclosure. It will be understood by those having skill in the art that wireless beacons can be placed in a myriad of locations, patterns, or other configurations to enabled the facility management, cargo management, and cargo delivery management systems and methods disclosed herein.

Figure 8:
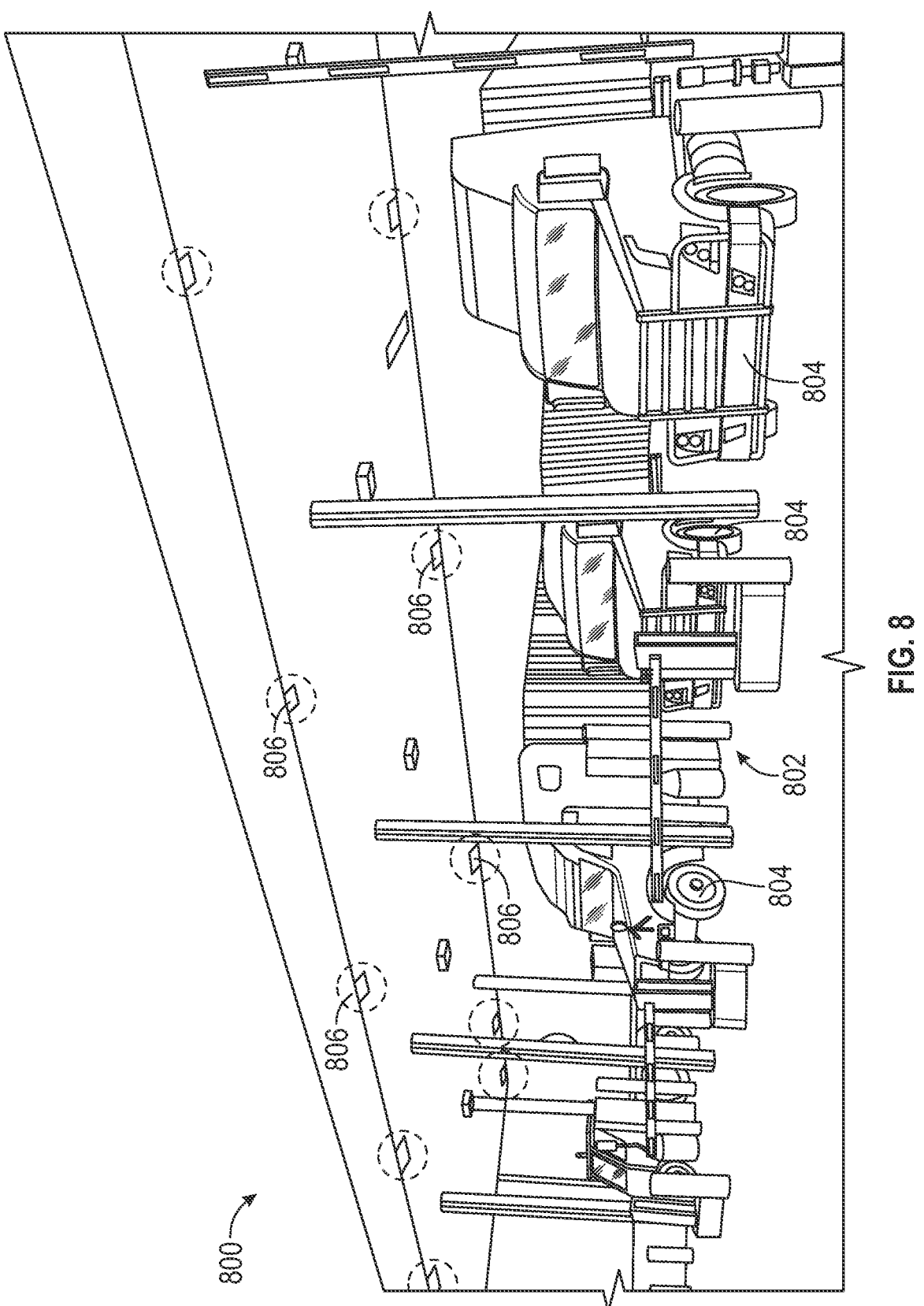
FIG. 8 illustrates an exemplary access point in accordance with one or more exemplary embodiments of the present disclosure.

FIG. 8 depicts a perspective view of an exemplary access point 800, such as an access point to an intermodal facility. In one embodiment, the access point 800 can include a plurality of divisions 802 (e.g., gated lanes or gates) through which vehicles 804 can pass with proper authentication. In another embodiment, a plurality of wireless beacons 806 can be included in the access point 800. For example, a wireless beacon 806 can be placed at an entrance to a gate 802 and at an exit of a gate 802. The wireless beacons 806 can be Bluetooth Low Energy beacons, ultra-wideband beacons, Wi-Fi beacons, RFID beacons, or any other type of wireless beacon. Preferably, the beacons can be detected by low energy technologies that can be found in widely commercialized and utilized mobile devices. In one example, a client can be a mobile device, such as a mobile phone carried by a driver of a vehicle 804. When a vehicle 804 mobilizes into a gated lane 802, in one embodiment, a client associated with the vehicle 804 can be located between a pair of wireless beacons 806 associated with a particular gated lane 802. In another embodiment, a facilities management system can utilize detection of the beacons 806 to determine a distance that the client is from at least two of the beacons 806. The system can then triangulate a position of the client to determine whether the client is in position for the gate 802 to be lifted.

It will be understood by those having skill in the art that the systems and methods disclosed herein can implement numerous proximity threshold and accuracy thresholds within the same process flow. For example, several proximity thresholds can be implemented upon approach or egress of a vehicle to or from a facility, respectively. In another embodiment, the systems and methods herein can utilize one or more proximity thresholds to instantiate or terminate any give processes or sub-processes as needed to facilitate the collection, calculation, and transmission of data in real time to any number of clients or components within a given system. It will further be understood that such systems and methods can be implemented throughout an intermodal facility infrastructure. For example, authentication and validation methods discussed herein can similarly be applied to exit points of a given facility, such that, for example, cargo being removed from a facility can be checked and validated to ensure that the proper cargo is being transported to the proper location.

The present disclosure achieves at least the following advantages:

1. Optimizing facility and delivery/pick-up vehicle intermeshing to facility cargo dispatch;

2. Generating prompts to ensure that an allocated cargo is accessible by a crane and/or a vehicle;

3. Prompting a vehicle operator to follow a pre-determined path based off of real-time data collection indicating congestion or lack of path conformance;

4. Validating identification information as a redundancy measure to ensure that the proper cargo is delivered to the proper location; and 5. Streamlining access point traffic flow to minimize congestion and maximize cargo dispatch efficiency.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for managing cargo in a facility, comprising:

a plurality of wireless beacons disposed proximate an intermodal facility, the wireless beacons configured to facilitate communication between a client and the system, wherein the plurality of wireless beacons can triangulate locations of clients or other components;

a memory having machine-readable instructions to perform program steps; and a networked computer processor operably coupled to the memory and capable of executing the machine-readable instructions to perform program steps, the program steps including:

detecting a client via at least one wireless beacon disposed proximate an access point;

receiving, via the at least one wireless beacon, positional data;

receiving identification information;

determining an expected time of arrival of the client;

transmitting the expected time of arrival;

determining a cargo allocated to the client;

identifying a cargo location;

if the cargo is not accessible:

determining an alternate zone; and generating, via the networked computer processor, and transmitting a prompt to a client associated with a cargo handling apparatus to initiate a physical relocation of the cargo to the alternate zone;

if the cargo is physically relocated, updating the cargo location and transmitting the cargo location;

if the client satisfies a proximity threshold, authenticating, by the networked computer processor, the client, the identification information, or both; and if the client, the identification information, or both are authenticated, automatically operate, by the networked computer processor, at least one access control barrier to de-obstruct the access point of the intermodal facility to allow the client to enter the intermodal facility.

2. The system of claim 1, wherein the program steps further include:

determining at least one path to the cargo location;

receiving positional data points of the client as the client moves; and comparing the positional data points to the at least one path.

3. The system of claim 2, wherein the program steps further include:

if the positional data points do not conform to the at least one path:

generating a directional prompt.

4. The system of claim 1, wherein the program steps further include:

receiving motion data of the client;

calculating, via the processor, an expected time until approach using the positional data and the motion data; and using the expected time until approach, the average access point delay, and the location of the client in determining the expected time of arrival.

5. The system of claim 1, wherein the program steps further include:

if the client, the identification information, or both are not authenticated, generating, by the networked computer processor, an alert to notify one or more of personnel, clients, a facility, and other components of the system for managing cargo in a facility that the client, the identification information, or both are not authenticated.

6. The system of claim 2, wherein at least one wireless beacon is used in generating the positional data points.

7. A method of managing cargo in a facility, comprising:

detecting a client via at least one of a plurality of wireless beacons disposed proximate an intermodal facility access point, the wireless beacons configured to provide communication between the client and a processor, wherein the plurality of wireless beacons can triangulate locations of clients or other components;

receiving, via the at least one wireless beacon, positional data;

receiving identification information;

determining an expected time of arrival of the client;

transmitting the expected time of arrival;

determining a cargo allocated to the client;

identifying a cargo location;

if the cargo is not accessible:

determining an alternate zone; and generating, via the processor, and transmitting a prompt to a client associated with a cargo handling apparatus to initiate a physical relocation of the cargo to the alternate zone;

if the cargo is physically relocated, updating the cargo location and transmitting the cargo location;

if the client satisfies a proximity threshold, authenticating, by the networked computer processor, the client, the identification information, or both; and if the client, the identification information, or both are authenticated, automatically operate, by the networked computer processor, at least one access control barrier to de-obstruct the access point of the intermodal facility to allow the client to enter the intermodal facility.

8. The system of claim 7, further comprising:

determining at least one path to the cargo location;

receiving positional data points of the client as the client moves; and comparing the positional data points to the at least one path.

9. The method of claim 8, further comprising:

if the positional data points do not conform to the at least one path:

generating a directional prompt.

10. The method of claim 7, further comprising:

receiving motion data of the client;

calculating, via the processor, an expected time until approach using the positional data and the motion data; and using the expected time until approach, the average access point delay, and the location of the client in determining the expected time of arrival.

11. The method of claim 7, further comprising:

if the client, the identification information, or both are not authenticated, generating, by the networked computer processor, an alert to notify one or more of personnel, clients, a facility, and other components of the system for managing cargo in a facility that the client, the identification information, or both are not authenticated.

12. The method of claim 8, wherein at least one wireless beacon is used in generating the positional data points.

\* \* \* \* \*